(12) United States Patent
Bae

(10) Patent No.: US 10,983,745 B2
(45) Date of Patent: Apr. 20, 2021

(54) DISPLAY DEVICE AND DISPLAY SYSTEM INCLUDING SAME

(71) Applicant: LG ELECTRONICS INC., Seoul (KR)

(72) Inventor: Kyungnam Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 178 days.

(21) Appl. No.: 16/303,777

(22) PCT Filed: Jun. 13, 2016

(86) PCT No.: PCT/KR2016/006272
§ 371 (c)(1),
(2) Date: Nov. 21, 2018

(87) PCT Pub. No.: WO2017/217563
PCT Pub. Date: Dec. 21, 2017

(65) Prior Publication Data
US 2020/0319835 A1    Oct. 8, 2020

(51) Int. Cl.
*G06F 3/14* (2006.01)
*H04N 21/436* (2011.01)
(Continued)

(52) U.S. Cl.
CPC ......... *G06F 3/1423* (2013.01); *H04N 21/436* (2013.01); *H04N 21/4402* (2013.01); *H04N 21/44008* (2013.01)

(58) Field of Classification Search
None
See application file for complete search history.

(56) References Cited

U.S. PATENT DOCUMENTS

2005/0052578 A1    3/2005    Phillips et al.
2009/0079663 A1    3/2009    Chang et al.
(Continued)

FOREIGN PATENT DOCUMENTS

EP           1531003 A1    9/2005
KR       2006-140564 A    6/2006
(Continued)

OTHER PUBLICATIONS

Miao et al., "A High-Fidelity and Low-Interaction-Delay Screen Sharing System," ACM Transactions on Multimedia Computing Communications and Applications, vol. 12, No. 3, Article 44, May 2016 (May 20, 2016), pp. 44:1 to 44:23, XP055560593.
(Continued)

*Primary Examiner* — Roy P Rabindranath
(74) *Attorney, Agent, or Firm* — Birch, Stewart, Kolasch & Birch, LLP

(57) ABSTRACT

A display device according to an embodiment of the present invention comprises: a network interface unit for connecting the display unit to a terminal; a decoder for decoding encoded data received from the terminal; a display unit; and a control unit for receiving, from the terminal, the encoded data comprising a plurality of integrally encoded content images, performing control such that the decoder decodes the encoded data, extracting each of the plurality of content images from decoded data generated as a result of the decoding, and performing control such that the display unit displays each of the extracted images.

11 Claims, 20 Drawing Sheets

(51) Int. Cl.
  *H04N 21/44*     (2011.01)
  *H04N 21/4402*   (2011.01)

(56) References Cited

U.S. PATENT DOCUMENTS

| | | | |
|---|---|---|---|
| 2010/0020086 A1* | 1/2010 | Suzuki | G06F 3/14 |
| | | | 345/502 |
| 2010/0026721 A1 | 2/2010 | Park et al. | |
| 2015/0201193 A1 | 7/2015 | Gu et al. | |
| 2015/0312508 A1 | 10/2015 | Phang et al. | |
| 2015/0371364 A1* | 12/2015 | Park | G06F 3/1454 |
| | | | 345/428 |
| 2016/0150177 A1 | 5/2016 | Minemura | |
| 2016/0253142 A1* | 9/2016 | Choi | G06F 3/1423 |
| | | | 345/1.3 |
| 2017/0160882 A1* | 6/2017 | Park | H04N 21/00 |

FOREIGN PATENT DOCUMENTS

| | | | |
|---|---|---|---|
| KR | 10-2015-0061743 A | 6/2015 |
| KR | 10-2015-0082949 A | 7/2015 |
| KR | 10-2016-0006193 A | 1/2016 |

OTHER PUBLICATIONS

Su et al., "A Design and Implementation of Multi-source Wi-Fi Display Model on Android Devices," 2015 International Conference on Intelligent Information Hiding and Multimedia Signal Processing, 2015 (Sep. 23, 2015), pp. 207-210. XP032869777.

* cited by examiner

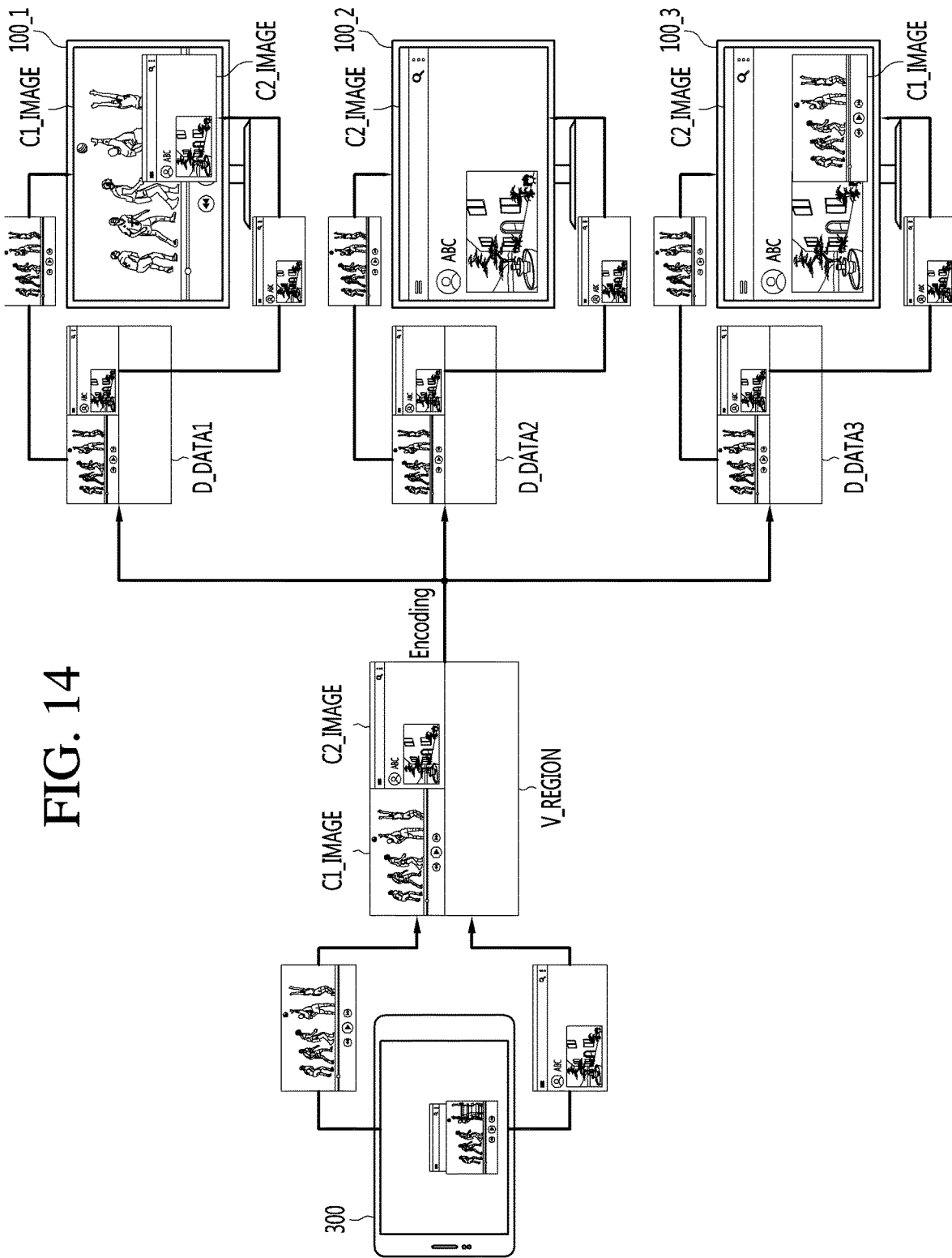

DISPLAY DEVICE AND DISPLAY SYSTEM INCLUDING SAME

CROSS REFERENCE TO RELATED APPLICATION

This application is the National Phase of PCT International Application No. PCT/KR2016/006272, filed on Jun. 13, 2016, all of which are hereby expressly incorporated by reference into the present application.

TECHNICAL FIELD

The present invention relates to a display device and a display system including the same, and more particularly, to a method of more efficiently transmitting and displaying a plurality of contents if the plurality of contents included in a terminal is displayed through a display device.

BACKGROUND ART

Mirroring (or screen mirroring) means that the screen of a terminal such as a smartphone or a tablet is displayed on another display device (for example, a TV, a monitor, a projector, etc.) without change. In general, since the size of the display screen of the terminal is limited, a user may use content provided by the terminal using a device having a large screen, such as a TV, through mirroring.

Examples of mirroring include Miracast™ technology provided by Wi-Fi Alliance®. Using devices supporting Miracast, the user may display the screen of a source device, for example, a smartphone, on the screen of a sink device, for example, the screen of a display device, without change. In addition, the user may control operation of the content displayed on the screen of the source device through the screen displayed on the sink device.

As the Miracast™ technology has been developed, the sink device may not only display the screen of the source device but also receive data related to the content executed or activated on the source device even if the content is not displayed on the screen of the source device and display the output screen of the content based on the received data. The sink device such as the TV generally has a larger screen than the smartphone and thus may display images of a plurality of contents executed or activated on the source device.

In this case, the source device may encode each of the images of the plurality of contents and transmit the encoded images to the sink device, and the sink device may decode and display the encoded images. The source device and the sink device include a plurality of encoders and decoders in order to encode and decode the plurality of images, respectively. Therefore, the number of provided contents may be restricted according to the number of encoders and decoders respectively provided in the source device and the sink device. In addition, product cost may increase as the number of encoders and decoders respectively provided in the source device and the sink device increases, and the resources of the device may be excessively consumed as the number of contents to be displayed through the sink device increases.

DISCLOSURE

Technical Problem

An object of the present invention devised to solve the problem lies in a method of more efficiently transmitting and displaying a plurality of contents if the plurality of contents included in a source device such as a terminal is displayed through a sink device such as a display device.

Technical Solution

The object of the present invention can be achieved by providing a display device including a network interface configured to establish connection with a terminal, a decoder configured to decode encoded data received from the terminal, a display unit, and a controller configured to receive, from the terminal, the encoded data obtained by integrally encoding images of a plurality of contents, to control the decoder to decode the encoded data, to extract each of the images of the plurality of contents from decoded data generated as a result of decoding, and to control the display unit to display each of the extracted images.

According to another aspect of the present invention, a display system includes a terminal configured to integrally encode images of a plurality of contents using an encoder to generate encoded data, and a display device configured to receive the encoded data from the terminal, to decode the encoded data using a decoder, to extract the images of the plurality of contents from decoded data generated as a result of decoding, and to display each of the extracted images through a display unit.

The terminal may arrange the images of the plurality of contents in a virtual region corresponding to maximum resolution supported by the encoder, encode the virtual region, in which the images of the plurality of contents is arranged, using the encoder, and transmit the encoded data generated as a result of encoding to the display device.

The terminal may generate coordinate information of each of the images of the plurality of contents arranged in the virtual region and transmit the generated coordinate information to the display device, and the display device may extract each of the images of the plurality of contents from the decoded data based on the coordinate information received from the terminal.

In some embodiments, the decoded data generated as a result of decoding may be substantially equal to the virtual region.

The display device may receive a request for adjusting a size of any one of the images of the plurality of contents displayed through the display unit and transmit size information of the image having the size adjusted according to the received request for adjusting the size to the terminal, and the terminal may adjust the size of any one of the plurality of images arranged in the virtual region based on the received size information and encode the virtual region using the encoder and transmits the encoded data generated as a result of encoding to the display device.

In some embodiments, if only one of the images of the plurality of contents is displayed through the display unit according to the request for adjusting the size, the terminal may arrange only the image in the virtual region.

The display device may transmit the size information to the terminal through a user input back channel (UIBC).

The display device may display a screen corresponding to the decoded data through the display unit, receive a request for selecting any one of the images of the plurality of contents included in the displayed screen, and display the selected image in an entire region of the display unit and displays the remaining images in partial regions.

In some embodiments, the display device may include a plurality of display devices, and the terminal may transmit the encoded data to each of the plurality of display devices, each of the plurality of display devices may receive the encoded data from the terminal, decodes the encoded data using a decoder and extract and display each of the images of the plurality of contents from decoded data generated as a result of decoding, and each of the plurality of display devices may display the images of the plurality of contents in different forms.

Advantageous Effects

According to various embodiments of the present invention, a terminal included in a display system may encode the images of a plurality of contents to be transmitted to a display device using only one encoder, and the display device may decode data received from the terminal using only one decoder to acquire the images of the plurality of contents. Accordingly, in the display device and the terminal, the number of encoders or decoders for encoding or decoding the plurality of contents may be reduced, thereby efficiently utilizing resources and reducing product costs.

According to various embodiments of the present invention, the terminal may encode the images using only one encoder and transmit the encoded images to each of the display devices, regardless of the number of display devices, to which the images of the plurality of contents will be transmitted, and each of the display devices may decode the received data from the terminal, extract the images and display the extracted images in various forms.

DESCRIPTION OF DRAWINGS

FIG. 14 is a diagram showing an example in which a terminal transmits images of a plurality of contents to a plurality of display devices according to the embodiment of the present invention.

BEST MODE

Figure 1:
FIG. 1 is a block diagram showing the configuration of a display system according to an embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless they have a clearly different meaning in the context.

Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Hereinafter, embodiments of the present invention will be described in detail with reference to the accompanying drawings.

FIG. 1 is a block diagram showing the configuration of a display system according to an embodiment of the present invention.

Referring to FIG. 1, a source device 10 and a sink device 20 may configure the display system and transmit and receive multimedia content such as video or sound, control signals, etc. through a session connected to each other.

That is, the source device 10 may transmit multimedia content to the sink device 20 through the connected session and may have a wireless LAN interface for streaming the multimedia content to the sink device 20.

Meanwhile, the sink device 20 may receive and reproduce the multimedia content from the source device 10 through the connected session.

Here, the source device 10 and the sink device 20 may be various devices such as a TV, a home theater system, a cellular phone, a smartphone or a tablet. Each device may serve as any one of a source device and a sink device according to hardware or software function or may serve as both a source device and a sink device.

For example, wireless connection between the source device 10 and the sink device 20 may be established using a frequency band of 5 GHz according to IEEE 802.11ac as the Wi-Fi standard. In this case, the source device 10 may stream uncompressed high definition (HD) video at a rate of up to 1 Gbps.

However, the present invention is not limited to the above-described wireless communication method and may be implemented by various communication methods using a frequency band of 60 GHz according to the IEEE 802.11ad standard.

The source device 10 and the sink device 20 belonging to one display system may be connected using a P2P connection method or a TDLS (Tunneled Direct Link Setup) connection method.

For example, the source device 10 and the sink device 20 may configure a network called a P2P group without an access point (AP) based on 802.11 WLAN technology to communicate data through a direct link. In this case, any one of the source device 10 and the sink device 20 may perform operation similar to that of the access point (AP) as a group owner (GO), thereby managing the P2P group.

The source device 10 and the sink device 20 may be connected to an infrastructure BSS including the access point (AP) and a distribution system to perform communication.

Meanwhile, the source device 10 and the sink device 20 may selectively connect the session using TDLS (Tunneled Direct Link Setup). In this case, the source device 10 and the sink device 20 may be connected to one access point (AP) to perform communication.

Hereinafter, the embodiments of the present invention will be described on the assumption that the source device 10 is a terminal such as a smartphone, a PC or a tablet and the sink device 20 is a display device such as a TV, a monitor or a projector.

Figure 2:
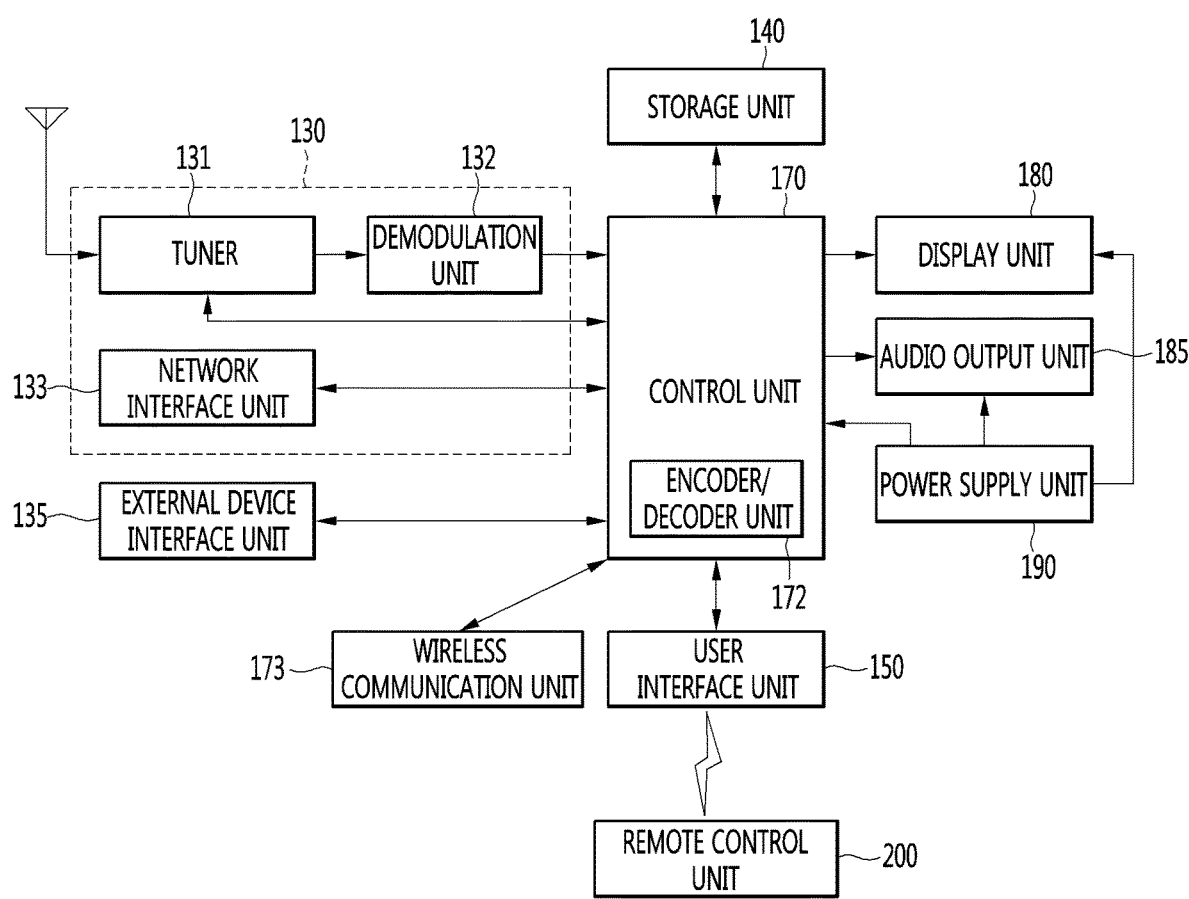
FIG. 2 is a block diagram showing the configuration of a display device as an embodiment of a sink device shown in FIG. 1.

FIG. 2 is a block diagram showing the configuration of a display device as an embodiment of a sink device shown in FIG. 1.

Referring to FIG. 2, the display device 200 may be implemented by a TV, a monitor, a projector or a device including the same.

A display device 100 can include a broadcast reception unit 130, an external device interface unit 135, a storage unit 140, a user input interface unit 150, a controller 170, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The external device interface unit 135 can receive an application or an application list in an adjacent external device and deliver it to the controller 170 or the storage unit 140.

The external device interface 135 can provide a connection path between the display device 100 and an external device. The display device 100 may be connected to the external device through the external device interface 135 by wire or wirelessly.

The external device interface 135 can receive at least one of image and audio output from an external device and deliver it to the controller 170. An external device connectable to the external device interface unit 135 can be one of a set-top box, a Blu-ray player, a DVD player, a game console, a sound bar, a smartphone, a PC, a USB Memory, and a home theater system but this is just exemplary.

The storage unit 140 can store signal-processed image, voice, or data signals stored by a program in order for each signal processing and control in the controller 170.

Additionally, the storage unit 140 can perform a function for temporarily store image, voice, or data signals output from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the controller 170 or deliver signals from the controller 170 to a user. For example, the user input interface unit 150 can receive or process control signals such as power on/off, channel selection, and screen setting from the remote control device 200 or transmit control signals from the controller 170 to the remote control device 200 according to various communication methods such as Bluetooth, Ultra Wideband (UWB), ZigBee, Radio Frequency (RF), and IR.

Additionally, the user input interface unit 150 can deliver, to the controller 170, control signals inputted from local keys (not shown) such as a power key, a channel key, a volume key, and a setting key.

Image signals that are image-processed in the controller 170 can be inputted to the display unit 180 and displayed as an image corresponding to corresponding image signals. Additionally, image signals that are image-processed in the controller 170 can be inputted to an external output device through the external device interface unit 135.

Voice signals processed in the controller 170 can be output to the audio output unit 185. Additionally, voice signals processed in the controller 170 can be inputted to an external output device through the external device interface unit 135.

Besides that, the controller 170 can control overall operations in the display device 100.

Additionally, the controller 170 can control the display device 100 by a user command or internal program inputted through the user input interface unit 150 and download a desired application or application list into the display device 100 in access to network.

The controller 170 can output channel information selected by a user together with processed image or voice signals through the display unit 180 or the audio output unit 185.

Additionally, according to an external device image playback command received through the user input interface unit 150, the controller 170 can output image signals or voice signals of an external device such as a camera or a camcorder, which are inputted through the external device interface unit 135, through the display unit 180 or the audio output unit 185.

Moreover, the controller 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

The display device 100 according to the embodiment of the present invention may include an encoder/decoder unit 172. Although the encoder/decoder unit 172 is shown as being included in the controller 170 in FIG. 2, the encoder/decoder unit 172 may be implemented separately from the controller 170 according to embodiments.

The encoder/decoder unit 172 may include at least one encoder and at least one decoder. The encoder and decoder may be implemented in hardware or software form.

The encoder may encode (or compress) image data using any one of various well-known formats and generate encoded data according to the result of encoding. The decoder may decode the encoded image data received from the inside or outside of the display device 100 and generate image data before encoding.

The encoder and the decoder may have supportable maximum resolution and the maximum resolution may be generally determined by the resolution of the display unit 180. For example, the maximum resolution may include 720p (1280*720), full HD (1920*1080), UHD (3840*2160), etc.

The display unit 180 can convert image signals, data signals, or OSD signals, which are processed in the controller 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 2, an image processing device such as the separated set-top box, and a content playback device including the display unit 180 and the audio output unit 185.

Figure 3:
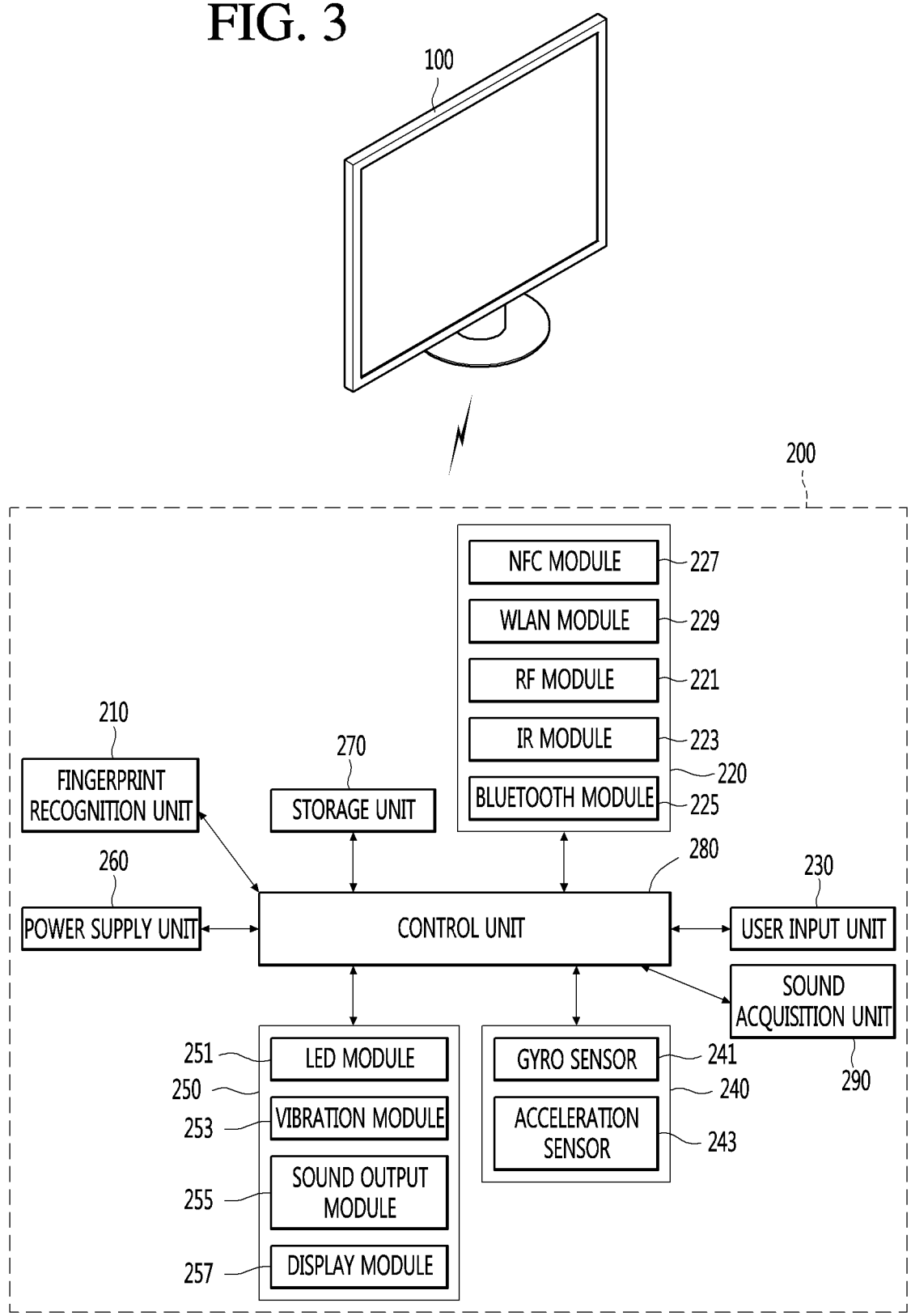
FIG. 3 is a block diagram illustrating a remote control device according to an embodiment of the present invention.
Figure 4:
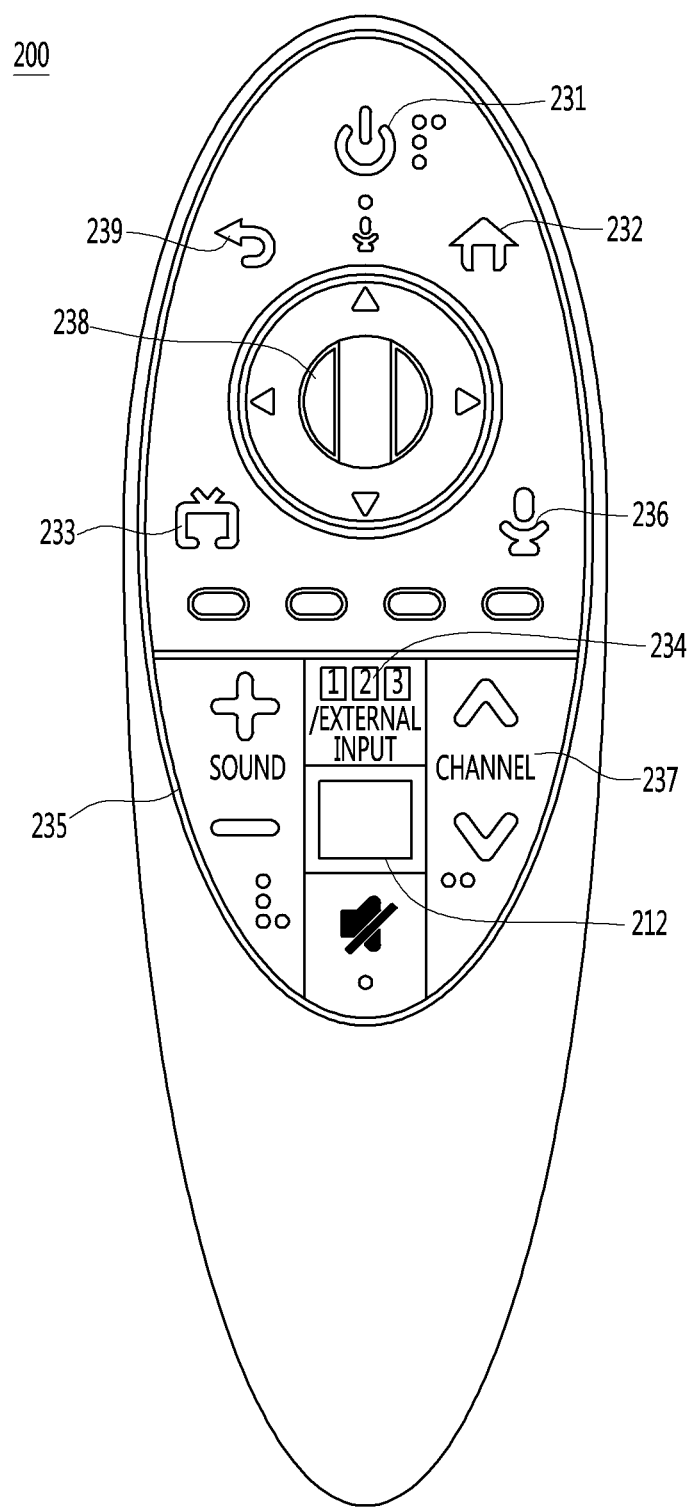
FIG. 4 is a view illustrating an actual configuration of a remote control device according to an embodiment of the present invention.

Then, referring to FIGS. 3 and 4, a remote control device is described according to an embodiment of the present invention.

FIG. 3 is a block diagram illustrating a remote control device according to an embodiment of the present invention and FIG. 4 is a view illustrating an actual configuration of a remote control device according to an embodiment of the present invention.

First, referring to FIG. 3, a remote control device 200 can include a fingerprint recognition unit 210, a wireless communication unit 220, a user input unit 230, a sensor unit 240, an output unit 250, a power supply unit 260, a storage unit 270, a controller 280, and a voice acquisition unit 290.

Referring to FIG. 3, the wireless communication unit 220 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 4.

Referring to FIG. 4, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 3 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage unit 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input unit 235 or a signal corresponding to a movement of the remote control device 200 sensed by the sensor unit 240 to the display device 100 through the wireless communication unit 220.

Additionally, the voice acquisition unit 290 of the remote control device 200 can obtain voice.

The voice acquisition unit 290 can include at least one microphone 291 and obtain voice through the microphone 291.

Figure 5:
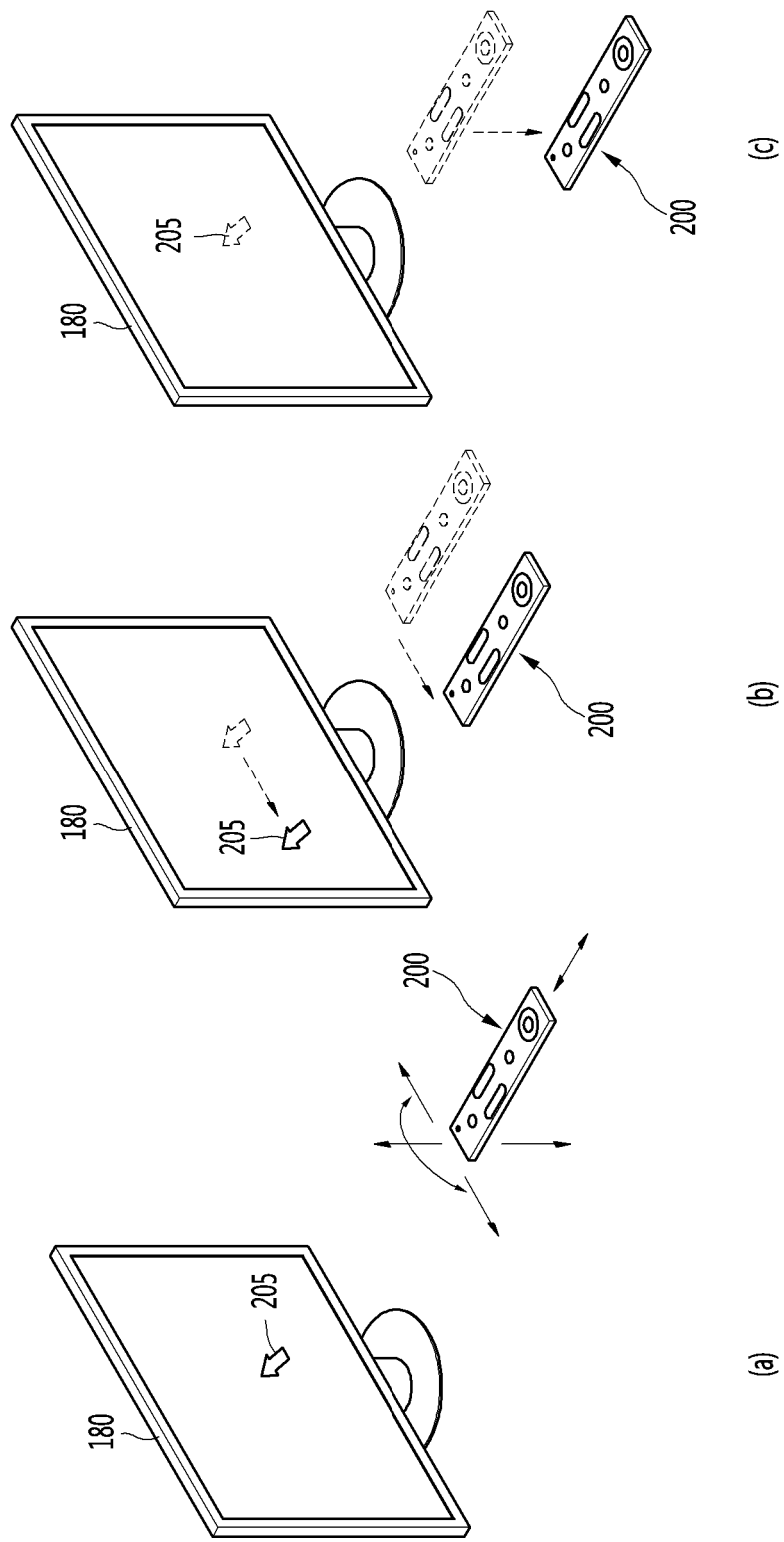
FIG. 5 is a view of utilizing a remote control device according to an embodiment of the present invention.

Then, FIG. 5 is described.

FIG. 5 is a view of utilizing a remote control device according to an embodiment of the present invention.

(a) of FIG. 5 illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

(b) of FIG. 4 illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

(c) of FIG. 4 illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 6:
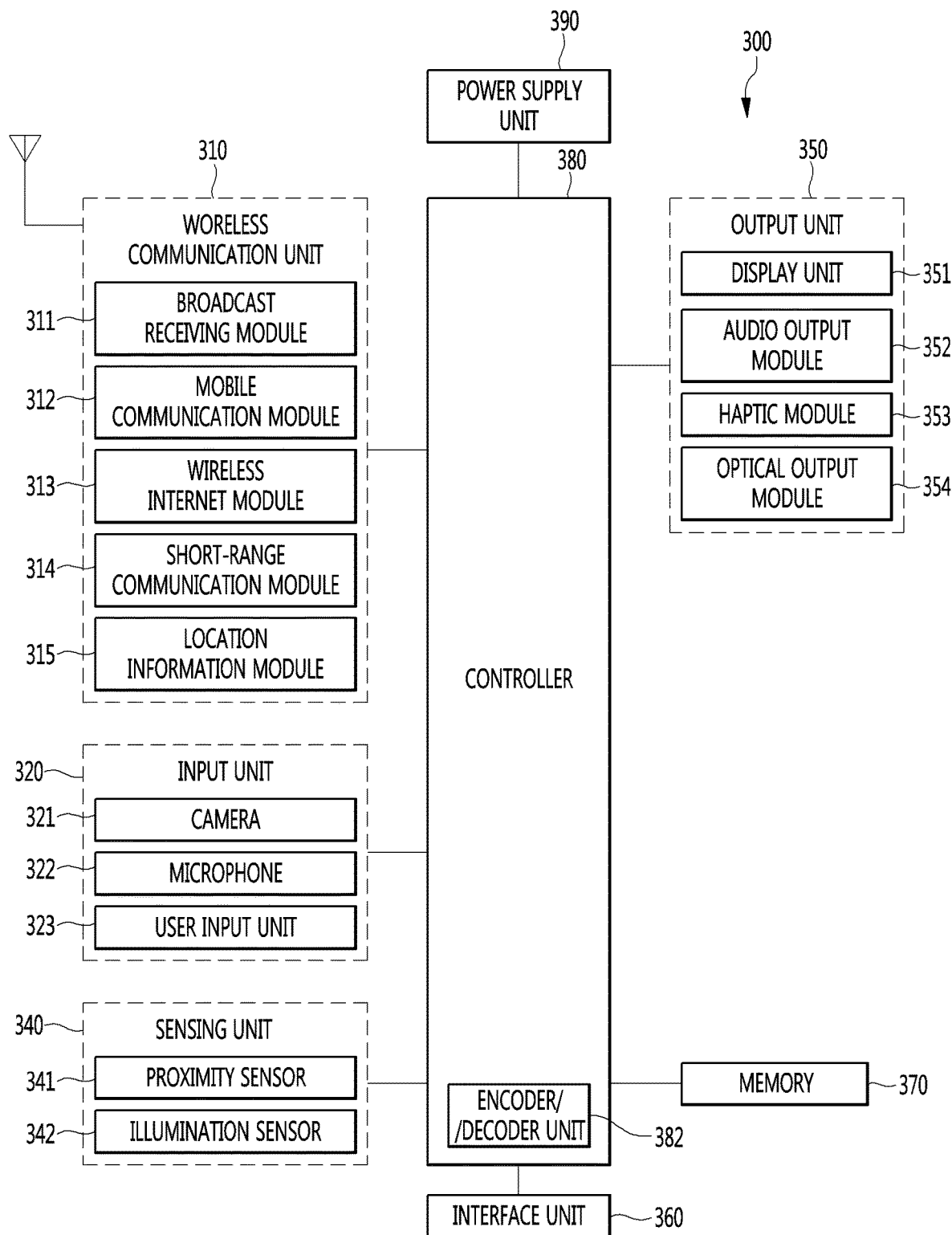
FIG. 6 is a block diagram showing the configuration of a terminal as an embodiment of a source device shown in FIG. 1.

FIG. 6 is a block diagram showing the configuration of a terminal as an embodiment of a source device shown in FIG. 1.

Referring to FIG. 6, the mobile terminal 300 is shown having components such as a wireless communication unit 310, an input unit 320, a sensing unit 340, an output unit 350, an interface unit 360, a memory 370, a controller 380, and a power supply unit 390. It is understood that implementing all of the illustrated components is not a requirement, and that greater or fewer components may alternatively be implemented.

The wireless communication unit 310 typically includes one or more modules which permit communications such as wireless communications between the mobile terminal 300 and a wireless communication system, communications between the mobile terminal 300 and another mobile terminal, communications between the mobile terminal 300 and an external server. Further, the wireless communication unit 110 typically includes one or more modules which connect the mobile terminal 100 to one or more networks.

To facilitate such communications, the wireless communication unit 310 includes one or more of a broadcast receiving module 311, a mobile communication module 312, a wireless Internet module 313, a short-range communication module 314, and a location information module 315.

The input unit 320 includes a camera 321 for obtaining images or video, a microphone 322, which is one type of audio input device for inputting an audio signal, and a user input unit 323 (for example, a touch key, a push key, a mechanical key, a soft key, and the like) for allowing a user to input information. Data (for example, audio, video, image, and the like) is obtained by the input unit 320 and may be analyzed and processed by controller 380 according to device parameters, user commands, and combinations thereof.

The sensing unit 340 is typically implemented using one or more sensors configured to sense internal information of the mobile terminal, the surrounding environment of the mobile terminal, user information, and the like. For example, the sensing unit 340 is shown having a proximity sensor 341, an illumination sensor 342, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 321), a microphone 322, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 300 may be configured to utilize information obtained from sensing unit 340, and in particular, information obtained from one or more sensors of the sensing unit 340, and combinations thereof.

The output unit 350 is typically configured to output various types of information, such as audio, video, tactile output, and the like. The output unit 350 is shown having a display unit 351, an audio output module 352, a haptic module 353, and an optical output module 354. The display unit 351 may have an inter-layered structure or an integrated structure with a touch sensor in order to facilitate a touch screen. The touch screen may provide an output interface between the mobile terminal 300 and a user, as well as function as the user input unit 323 which provides an input interface between the mobile terminal 300 and the user.

The interface unit 360 serves as an interface with various types of external devices that can be coupled to the mobile terminal 300. The interface unit 360, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 360.

The memory 370 is typically implemented to store data to support various functions or features of the mobile terminal 300. For instance, the memory 370 may be configured to store application programs executed in the mobile terminal 300, data or instructions for operations of the mobile terminal 300, and the like. Some of these application programs may be downloaded from an external server via wireless communication. Other application programs may be installed within the mobile terminal 300 at time of manufacturing or shipping, which is typically the case for basic functions of the mobile terminal 300 (for example, receiving a call, placing a call, receiving a message, sending a message, and the like). It is common for application programs to be stored in the memory 370, installed in the mobile terminal 300, and executed by the controller 380 to perform an operation (or function) for the mobile terminal 300.

The controller 380 typically functions to control overall operation of the mobile terminal 300, in addition to the operations associated with the application programs. The controller 380 may provide or process information or functions appropriate for a user by processing signals, data, information and the like, which are input or output by the various components, or activating application programs stored in the memory 370.

As one example, the controller 380 controls some or all of the components illustrated in FIG. 6 according to the execution of an application program that have been stored in the memory 370.

The terminal 300 may include an encoder/decoder unit 382. Although the encoder/decoder unit 382 is shown as being included in the controller 380 in FIG. 6, the encoder/decoder unit 382 may be implemented separately from the controller 170 according to embodiments.

The encoder/decoder unit 382 is substantially equal to the encoder/decoder unit 172 of the display device 100 described with reference to FIG. 2 and thus a description thereof will be omitted.

The power supply unit 390 can be configured to receive external power or provide internal power in order to supply appropriate power required for operating elements and components included in the mobile terminal 300. The power supply unit 390 may include a battery, and the battery may be configured to be embedded in the terminal body, or configured to be detachable from the terminal body.

At least some of the components may operate in cooperation with each other to implement an operation, control, or control method of a mobile terminal according to various embodiments to be described below. Also, the operation, control, or control method of the mobile terminal may be implemented on the mobile terminal by driving at least one application program stored in the memory 370.

Hereinafter, the components listed above will be described in more detail with reference to FIG. 6 before various embodiments implemented through the aforementioned mobile terminal 300 are described.

Regarding the wireless communication unit 310, the broadcast receiving module 311 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 311 may be utilized to facilitate simultaneously receiving of two or more broadcast channels, or to support switching among broadcast channels.

The mobile communication module 312 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 312 include audio call signals, video (telephony) call signals, or various formats of data to support communication of text and multimedia messages.

The wireless Internet module 313 is configured to facilitate wireless Internet access. This module may be internally or externally coupled to the mobile terminal 300. The wireless Internet module 313 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 313 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 313 performs such wireless Internet access. As such, the Internet module 313 may cooperate with, or function as, the mobile communication module 312.

The short-range communication module 314 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 314 in general supports wireless communications between the mobile terminal 300 and a wireless communication system, communications between the mobile terminal 300 and another mobile terminal 300, or communications between the mobile terminal and a network where another mobile terminal 300 (or an external server) is located, via wireless area networks. One example of the wireless area networks is a wireless personal area networks.

The location information module 315 is generally configured to detect, calculate, derive or otherwise identify a position of the mobile terminal. As an example, the location information module 315 includes a Global Position System (GPS) module, a Wi-Fi module, or both. If desired, the location information module 315 may alternatively or additionally function with any of the other modules of the wireless communication unit 310 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 320 may be configured to permit various types of input to the mobile terminal 120. Examples of such input include audio, image, video, data, and user input. Image and video input is often obtained using one or more cameras 321. Such cameras 321 may process image frames of still pictures or video obtained by image sensors in a video or image capture mode. The processed image frames can be displayed on the display unit 351 or stored in memory 370. In some cases, the cameras 321 may be arranged in a matrix configuration to permit a plurality of images having various angles or focal points to be input to the mobile terminal 300. As another example, the cameras 321 may be located in a stereoscopic arrangement to acquire left and right images for implementing a stereoscopic image.

The microphone 322 is generally implemented to permit audio input to the mobile terminal 300. The audio input can be processed in various manners according to a function being executed in the mobile terminal 300. If desired, the microphone 322 may include assorted noise removing algorithms to remove unwanted noise generated in the course of receiving the external audio.

The user input unit 323 is a component that permits input by a user. Such user input may enable the controller 380 to control operation of the mobile terminal 300. The user input unit 323 may include one or more of a mechanical input element (for example, a key, a button located on a front and/or rear surface or a side surface of the mobile terminal 300, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 340 is generally configured to sense one or more of internal information of the mobile terminal, surrounding environment information of the mobile terminal, user information, or the like. The controller 380 generally cooperates with the sending unit 340 to control operation of the mobile terminal 300 or execute data processing, a function or an operation associated with an application program installed in the mobile terminal based on the sensing provided by the sensing unit 340. The sensing unit 340 may be implemented using any of a variety of sensors, some of which will now be described in more detail.

The proximity sensor 341 may include a sensor to sense presence or absence of an object approaching a surface, or an object located near a surface, by using an electromagnetic field, infrared rays, or the like without a mechanical contact. The proximity sensor 341 may be arranged at an inner region of the mobile terminal covered by the touch screen, or near the touch screen.

The proximity sensor 341, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 341 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 341 may sense proximity touch, and proximity touch patterns (for example, distance, direction, speed, time, position, moving status, and the like). In general, controller 380 processes data corresponding to proximity touches and proximity touch patterns sensed by the proximity sensor 341, and cause output of visual information on the touch screen. In addition, the controller 380 can control the mobile terminal 300 to execute different operations or process different data according to whether a touch with respect to a point on the touch screen is either a proximity touch or a contact touch.

A touch sensor can sense a touch applied to the touch screen, such as display unit 351, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 351, or convert capacitance occurring at a specific part of the display unit 351, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 380. Accordingly, the controller 380 may sense which region of the display unit 351 has been touched. Here, the touch controller may be a component separate from the controller 380, the controller 380, and combinations thereof.

In some embodiments, the controller 380 may execute the same or different controls according to a type of touch object that touches the touch screen or a touch key provided in addition to the touch screen. Whether to execute the same or different control according to the object which provides a touch input may be decided based on a current operating state of the mobile terminal 300 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 380, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 321 typically includes at least one a camera sensor (CCD, CMOS etc.), a photo sensor (or image sensors), and a laser sensor.

Implementing the camera 321 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 351 is generally configured to output information processed in the mobile terminal 300. For example, the display unit 351 may display execution screen information of an application program executing at the mobile terminal 300 or user interface (UI) and graphic user interface (GUI) information in response to the execution screen information.

In some embodiments, the display unit 351 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 352 is generally configured to output audio data. Such audio data may be obtained from any of a number of different sources, such that the audio data may be received from the wireless communication unit 310 or may have been stored in the memory 370. The audio data may be output during modes such as a signal reception mode, a call mode, a record mode, a voice recognition mode, a broadcast reception mode, and the like. The audio output module 352 can provide audible output related to a particular function (e.g., a call signal reception sound, a message reception sound, etc.) performed by the mobile terminal 300. The audio output module 352 may also be implemented as a receiver, a speaker, a buzzer, or the like.

A haptic module 353 can be configured to generate various tactile effects that a user feels, perceive, or otherwise experience. A typical example of a tactile effect generated by the haptic module 353 is vibration. The strength, pattern and the like of the vibration generated by the haptic module 353 can be controlled by user selection or setting by the controller. For example, the haptic module 353 may output different vibrations in a combining manner or a sequential manner.

Besides vibration, the haptic module 353 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 353 can also be implemented to allow the user to feel a tactile effect through a muscle sensation such as the user's fingers or arm, as well as transferring the tactile effect through direct contact. Two or more haptic modules 353 may be provided according to the particular configuration of the mobile terminal 300.

An optical output module 354 can output a signal for indicating an event generation using light of a light source. Examples of events generated in the mobile terminal 300 may include message reception, call signal reception, a missed call, an alarm, a schedule notice, an email reception, information reception through an application, and the like.

A signal output by the optical output module 354 may be implemented in such a manner that the mobile terminal emits monochromatic light or light with a plurality of colors. The signal output may be terminated as the mobile terminal senses that a user has checked the generated event, for example.

The interface unit 360 serves as an interface for external devices to be connected with the mobile terminal 300. For example, the interface unit 360 can receive data transmitted from an external device, receive power to transfer to elements and components within the mobile terminal 300, or transmit internal data of the mobile terminal 300 to such external device. The interface unit 360 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 300 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 300 via the interface unit 360.

When the mobile terminal 300 is connected with an external cradle, the interface unit 360 can serve as a passage to allow power from the cradle to be supplied to the mobile terminal 300 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 370 can store programs to support operations of the controller 380 and store input/output data (for example, phonebook, messages, still images, videos, etc.). The memory 370 may store data related to various patterns of vibrations and audio which are output in response to touch inputs on the touch screen.

The memory 370 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EE-PROM), a Programmable Read-Only memory (PROM), a magnetic memory, a magnetic disk, an optical disk, and the like. The mobile terminal 300 may also be operated in relation to a network storage device that performs the storage function of the memory 370 over a network, such as the Internet.

The controller 380 may typically control the general operations of the mobile terminal 300. For example, the controller 380 may set or release a lock state for restricting a user from inputting a control command with respect to applications when a status of the mobile terminal meets a preset condition.

The controller 380 can also perform the controlling and processing associated with voice calls, data communications, video calls, and the like, or perform pattern recognition processing to recognize a handwriting input or a picture drawing input performed on the touch screen as characters or images, respectively. In addition, the controller 380 can control one or a combination of those components in order to implement various exemplary embodiments disclosed herein.

The power supply unit 390 receives external power or provide internal power and supply the appropriate power required for operating respective elements and components included in the mobile terminal 300. The power supply unit 390 may include a battery, which is typically rechargeable or be detachably coupled to the terminal body for charging.

The power supply unit 390 may include a connection port. The connection port may be configured as one example of the interface unit 360 to which an external charger for supplying power to recharge the battery is electrically connected.

As another example, the power supply unit 390 may be configured to recharge the battery in a wireless manner without use of the connection port. In this example, the power supply unit 390 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Next, a method of operating a display system including a display device according to an embodiment of the present invention will be described.

Figure 7:
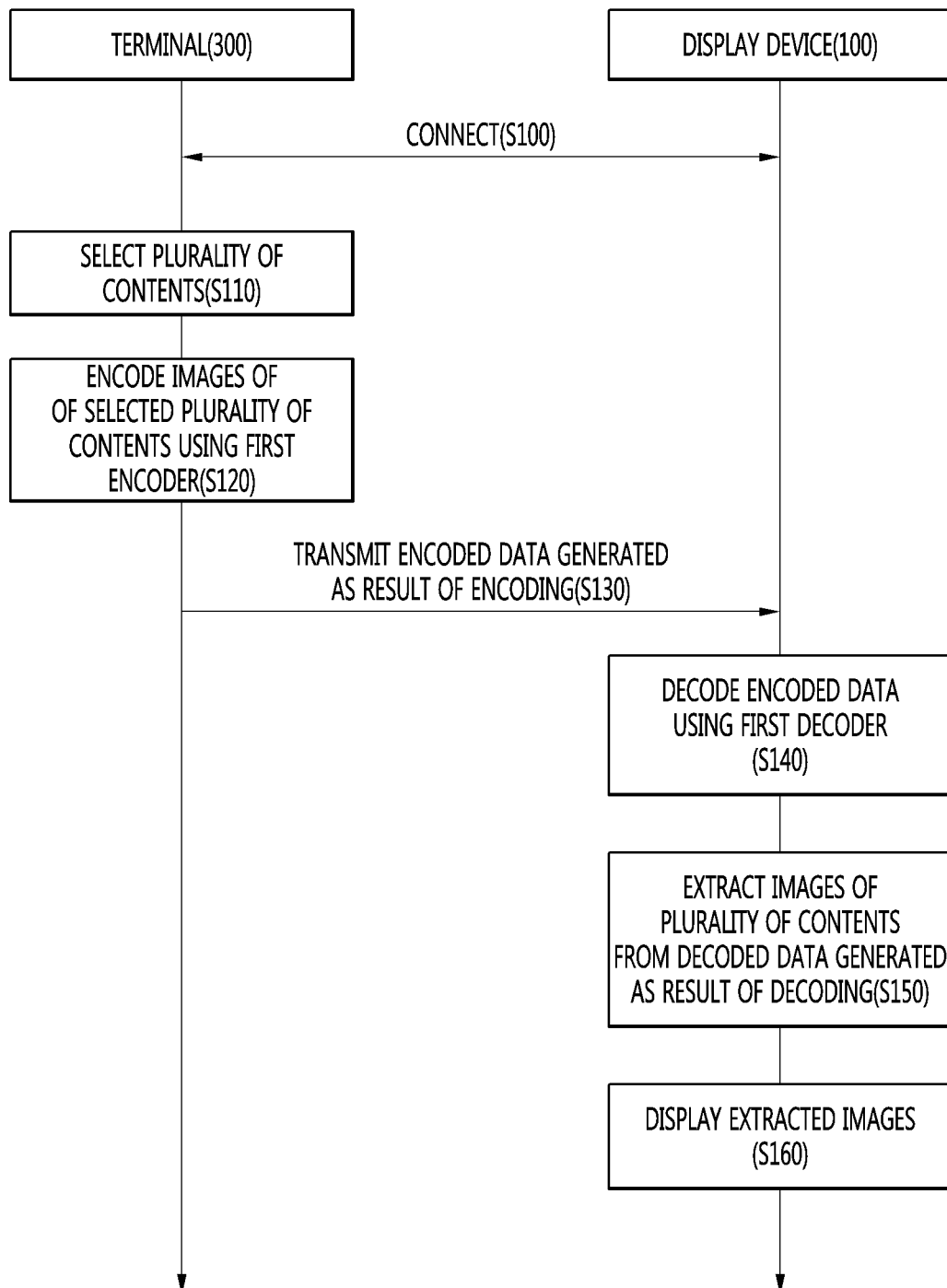
FIG. 7 is a ladder diagram illustrating operation of the display system according to the embodiment of the present invention.

FIG. 7 is a ladder diagram illustrating operation of the display system according to the embodiment of the present invention.

Referring to FIG. 7, in order to display a plurality of contents stored in the terminal 300 through the display device 100, the display device 100 and the terminal 300 may be connected (S100).

The display device 100 and the terminal 300 may be connected by wire or wirelessly. For example, the display device 100 and the terminal 300 may be connected by wire through a high definition multimedia interface (HDMI) cable or a wired local area network (LAN) cable. In some embodiments, the display device 100 and the terminal 300 may be connected wirelessly through wireless communication methods such as Wi-Fi, Wi-Fi direct, etc.

When a plurality of contents to be displayed through the display device 100 is selected (S110), the terminal 300 may encode the images of the plurality of selected contents using any one encoder (e.g., a first encoder) included in the encoder/decoder unit 382 (S120).

The controller 380 of the terminal 300 may receive a request for selecting the plurality of contents to be displayed through the display device 100 from among the contents stored in the terminal 300. The contents may include not only various applications installed in the terminal 300 (e.g., a video player, an image viewer, an Internet application, a game application, a messenger application, etc.) but also a video, a photo, etc. provided through the various applications.

In some embodiments, the plurality of selected contents may be contents which are currently being executed or displayed on the terminal 300.

According to the embodiment of the present invention, the controller 380 may encode the images of the plurality of selected contents as one encoded datum using any one (the first encoder) of at least one encoder included in the encoder/decoder unit 382. That is, the first encoder may collectively (simultaneously) encode the images of the plurality of contents. Operation of the controller 380 to collectively encode the images of the plurality of contents will be described in greater detail with reference to FIGS. 8a to 9b.

The terminal 300 may transmit encoded data generated as the result of encoding to the display device 100 (S130).

That is, the encoded data transmitted to the display device 100 may include all the images of the plurality of contents selected in step S110. The terminal 300 may transmit the encoded data to the display device 100 in the form of a bitstream.

The display device 100 may decode the encoded data received from the terminal 300 using any one decoder (e.g., a first decoder) included in the encoder/decoder unit 172 (S140).

The controller 170 of the terminal 100 may decode the encoded data using any one (the first decoder) of at least one decoder included in the encoder/decoder unit 172. For example, the controller 170 may check the encoding format of the encoded data and activate the first decoder capable of decoding the encoded data based on the checked result. The controller 170 may decode the encoded data using the activated first decoder.

The display device 100 may extract the images of the plurality of contents from the decoded data generated as the result of decoding (S150).

The decoded data generated as the result of decoding may be substantially equal to data before encoding the images of the plurality of contents using the first encoder of the terminal 300.

The controller 170 may extract the images of the plurality of contents from the decoded data. Operation of the controller 170 to extract the images of the plurality of contents will be described in greater detail with reference to FIGS. 9a to 9b.

The display device 100 may display the extracted images of the plurality of contents through the display unit 180 (S160).

Specifically, the controller 170 may display at least one of the images of the plurality of contents extracted from the decoded data through the display unit 180 using various methods.

For example, the controller 170 may display the image of any one content in the entire region of the display unit 180 and display the images of the remaining contents to overlap in partial regions of the display unit 180.

In some embodiments, the controller 170 may display a screen corresponding to the decoded data including the plurality of images through the display unit 180 and receive a request for selecting any one of the plurality of images included in the displayed screen. The controller 170 may display the selected image in the entire region of the display unit 180 according to the received request and display the remaining images in partial regions.

Steps S100 to S160 will be described in greater detail with reference to FIGS. 8*a* to 10*b*.

FIGS. 8*a* to 8*d* are diagrams showing examples of operation of the display system shown in FIG. 7.

Figure 8A:
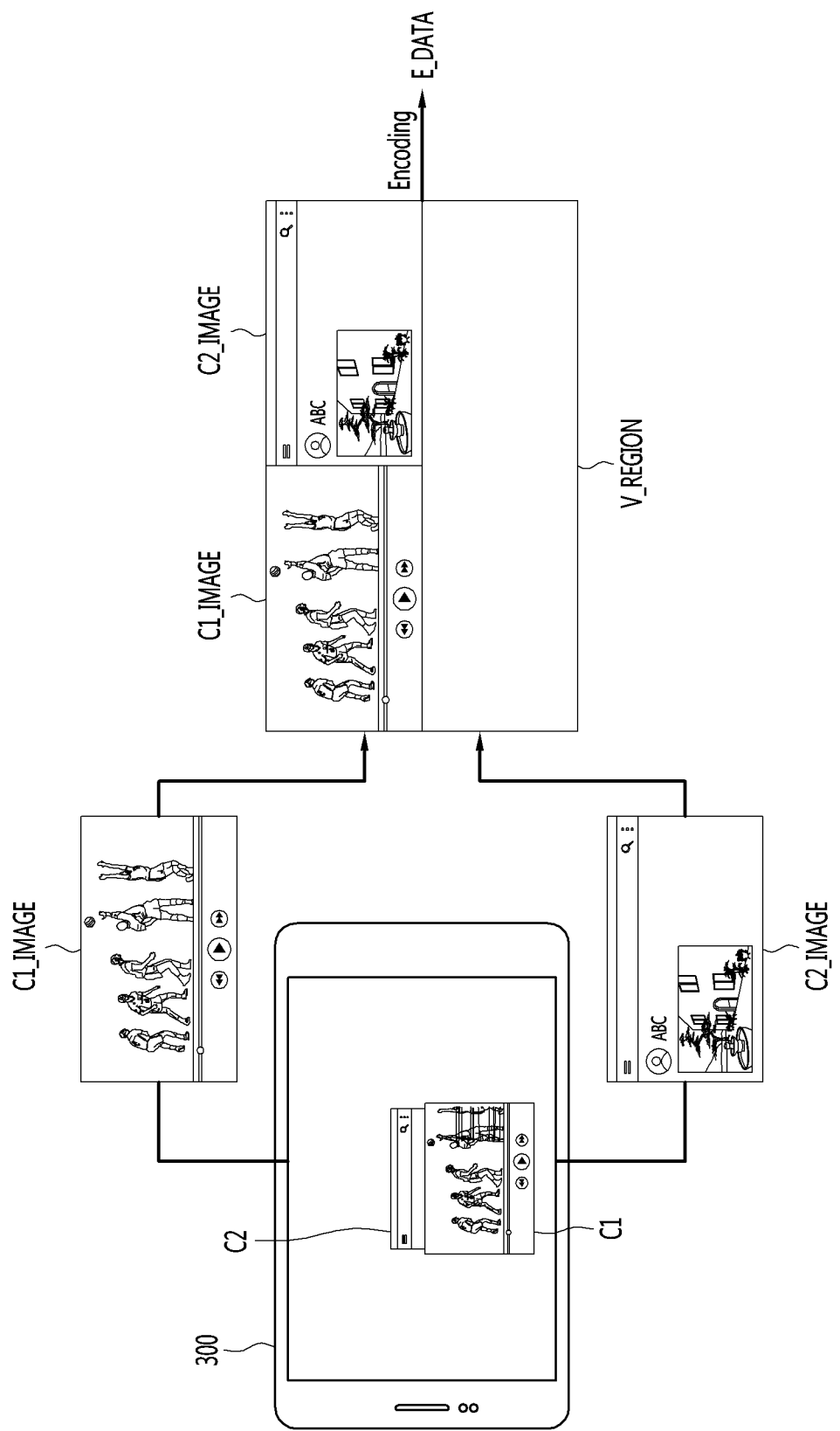
FIGS. 8a to 8d are diagrams showing examples of operation of the display system shown in FIG. 7.

Referring to FIG. 8*a*, the controller 380 of the terminal 300 may receive a request for selecting a plurality of contents (e.g., a first content C1 and a second content C2) to be displayed through the display device 100 from among the contents stored (or installed) in the terminal 300. For example, the request for selecting the first content C1 and the second content C2 may be received through the user input unit 323 such as a touchscreen.

In some embodiments, the controller 380 may automatically select the first content C1 and the second content C2, which are currently being executed by the terminal 300, as content to be displayed through the display device 100.

The controller 380 may encode images C1_IMAGE and C2_IMAGE in order to transmit the image C1_IMAGE of the selected first content C1 and the image C2_IMAGE of the second content C2 to the display device 100. Here, the image C1_IMAGE or C2_IMAGE may mean the output screen output as the first content C1 or the second content is executed or activated.

In particular, the terminal 300 according to the embodiment of the present invention may collectively (or simultaneously) encode the images C1_IMAGE and C2_IMAGE using any one (e.g., the first encoder) of at least one encoder included in the encoder/decoder unit 382.

Specifically, the controller 380 may generate a virtual region V_REGION corresponding to the maximum resolution supported by the first encoder. For example, if the first encoder supports resolution of up to UHD (3840*2160), the controller 380 may generate a virtual region V_REGION having a size of 3840*2160.

The controller 380 may arrange the image C1_IMAGE of the first content and the image C2_IMAGE of the second content in the generated virtual region V_REGION. For example, if each of the images C1_IMAGE and C2_IMAGE has resolution of FULL HD (1920*1080), the controller 380 may arrange the images C1_IMAGE and C2_IMAGE in the virtual region V_REGION, as shown in FIG. 8*a*. The form of arrangement of the images C1_IMAGE and C2_IMAGE in the virtual region V_REGION may be various.

In some embodiments, if the resolution of at least one of the images C1_IMAGE and C2_IMAGE exceeds the size of the virtual region V_REGION, that is, the images C1_IMAGE and C2_IMAGE are not suitable to be arranged in the virtual region V_REGION, the controller 380 may adjust the resolution of at least one of the images C1_IMAGE and C2_IMAGE and arrange the images in the virtual region V_REGION. For example, if the virtual region V_REGION has a size of 3840*2160 and each of the images C1_IMAGE and C2_IMAGE has UHD resolution, the controller 380 may adjust the resolution of each of the images C1_IMAGE and C2_IMAGE to FULL HD resolution and arrange the images C1_IMAGE and C2_IMAGE having the adjusted resolution in the virtual region V_REGION.

The controller 380 may control the first encoder to encode the virtual region V_REGION in which the images C1_IMAGE and C1_IMAGE are arranged. The first encoder may encode the virtual region V_REGION according to a predefined encoding format, thereby generating encoded data E_DATA. The controller 380 may transmit the encoded data E_DATA to the display device 100.

Figure 8B:
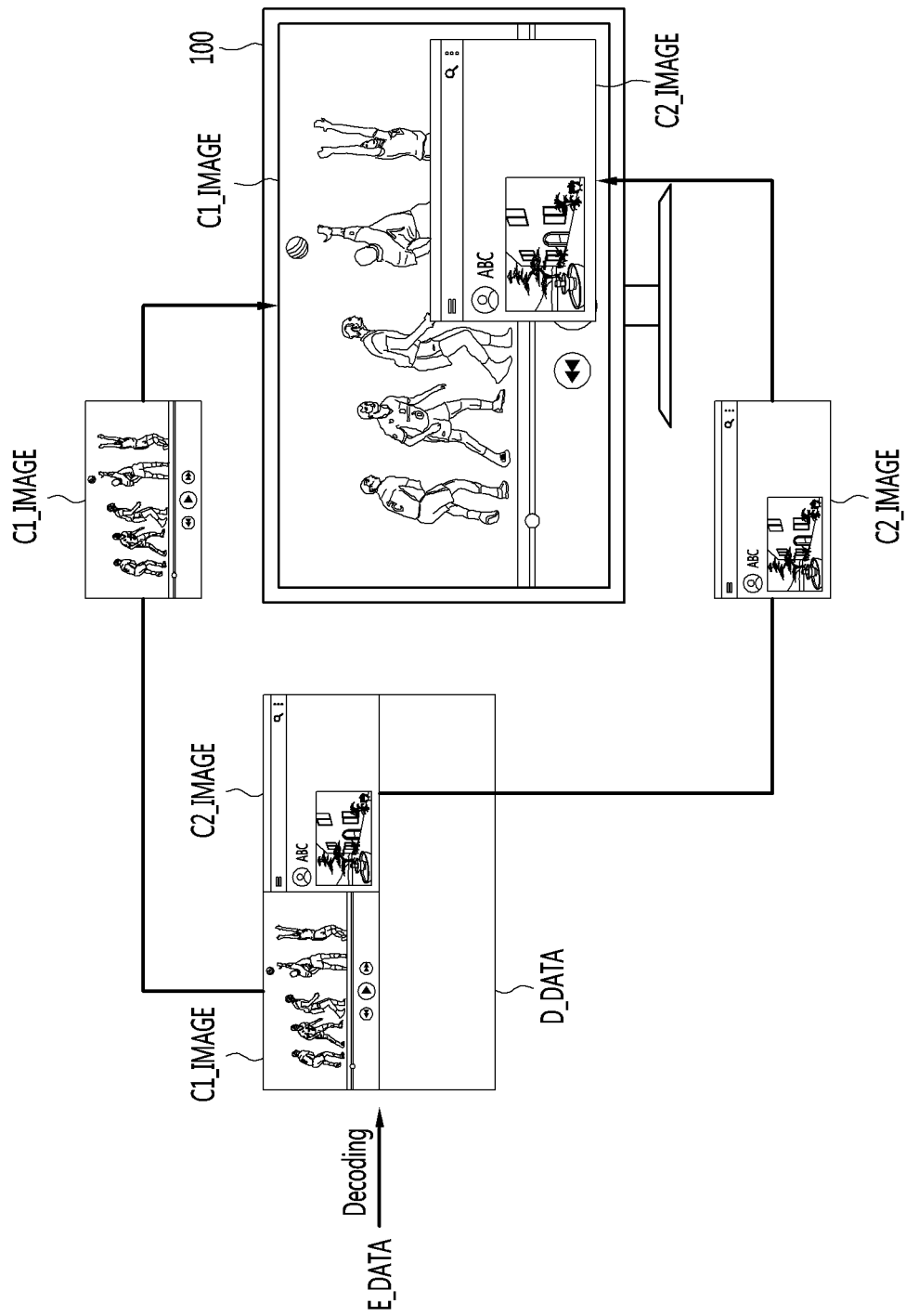

Referring to FIG. 8*b*, the display device 100 may receive the encoded data E_DATA from the terminal 300. The controller 170 may decode the encoded data E_DATA using any one (e.g., the first decoder) of at least one decoder included in the encoder/decoder unit 172.

Specifically, the controller 170 may decode the first decoder supporting the above-described encoding format from the at least one decoder based on the encoding format of the encoded data E_DATA. Information on the encoding format may be received from the terminal 300, without being limited thereto.

The controller 170 may control the selected first decoder to decode the encoded data E_DATA. Decoded data D_DATA generated as the result of decoding may be substantially equal to the virtual region V_REGION shown in FIG. 8*a*. The decoded data D_DATA may include the image C1_IMAGE of the first content and the image C2_IMAGE of the second content.

The controller 170 may extract the images C1_IMAGE and C2_IMAGE included in the decoded data D_DATA and display the extracted images C1_IMAGE and C2_IMAGE through the display unit 180. Operation of the controller 170 to extract the images C1_IMAGE and C2_IMAGE included in the decoded data D_DATA will be described in detail with reference to FIGS. 9*a* to 9*b*.

As shown in FIG. 8*b*, the controller 170 may display the image C1_IMAGE of the first content in the entire region of the display unit 180 and display the second image C2_IMAGE of the second content to overlap in a partial region. In some embodiments, the controller 170 may display the images C1_IMAGE and C2_IMAGE in various forms. For example, the images C1_IMAGE and C2_IMAGE may be respectively displayed in divided regions of the display unit 180 and only any one of the images C1_IMAGE and C2_IMAGE may be displayed through the display unit 180.

In addition, the controller 170 may perform resolution or size conversion with respect to the extracted images C1_IMAGE and C2_IMAGE based on the display sizes of the images C1_IMAGE and C2_IMAGE.

For example, assume that the extracted images C1_IMAGE and C2_IMAGE have a size of resolution of FULL HD (1920*1080), the display unit 180 has resolution of UHD (3840*2160), the image C1_IMAGE of the first content is displayed in the entire region of the display unit 180, and the image C2_IMAGE of the second content is displayed in a partial region of the display unit 180 with a size of FULL HD resolution. The controller 170 may perform resolution or size conversion with respect to the image C1_IMAGE of the first content and may not perform resolution or size conversion with respect to the image C1_IMAGE of the second content. In this case, the quality of the image C1_IMAGE of the first content displayed through the display unit 180 may slightly deteriorate.

Figure 8C:
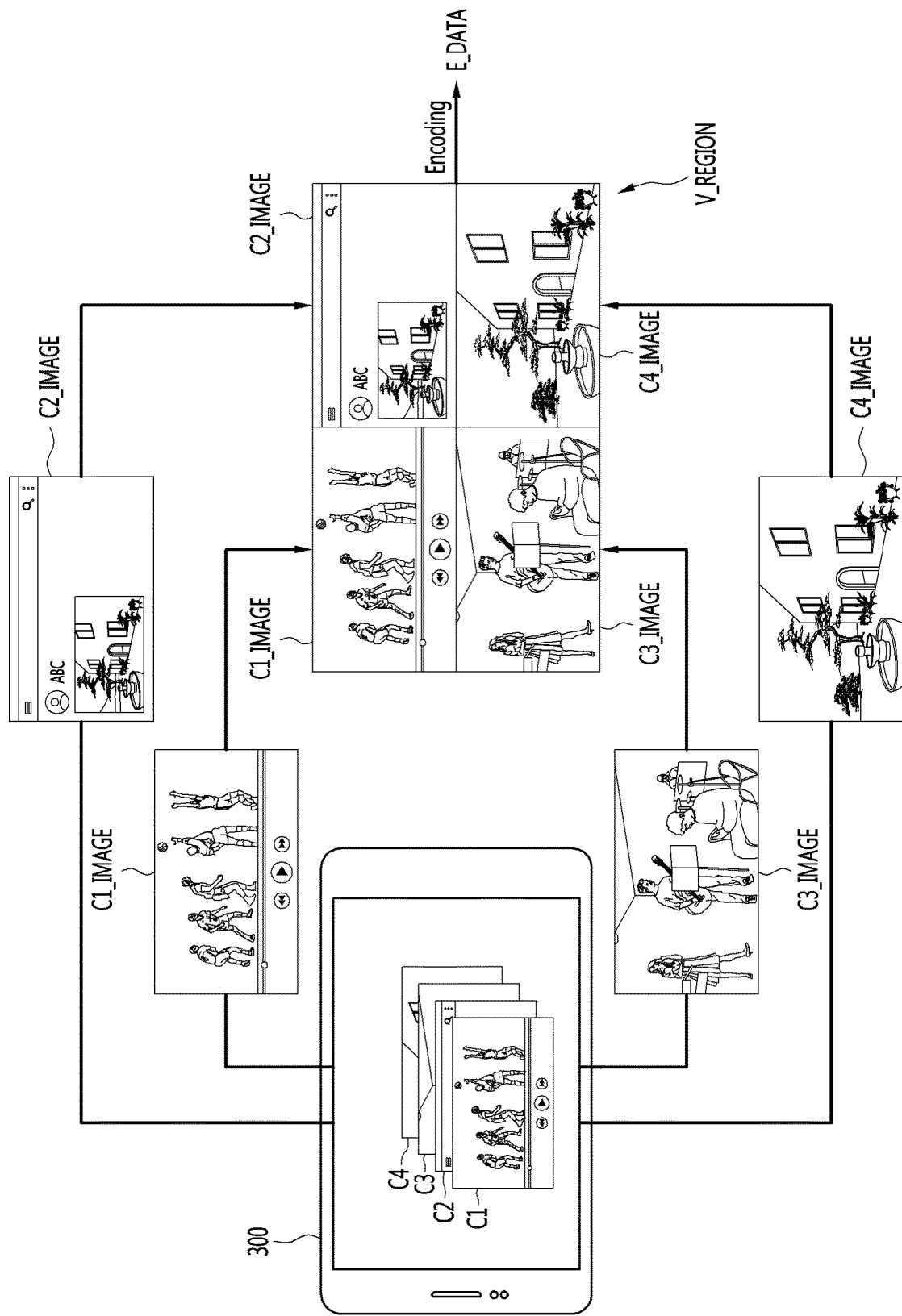
Figure 8D:
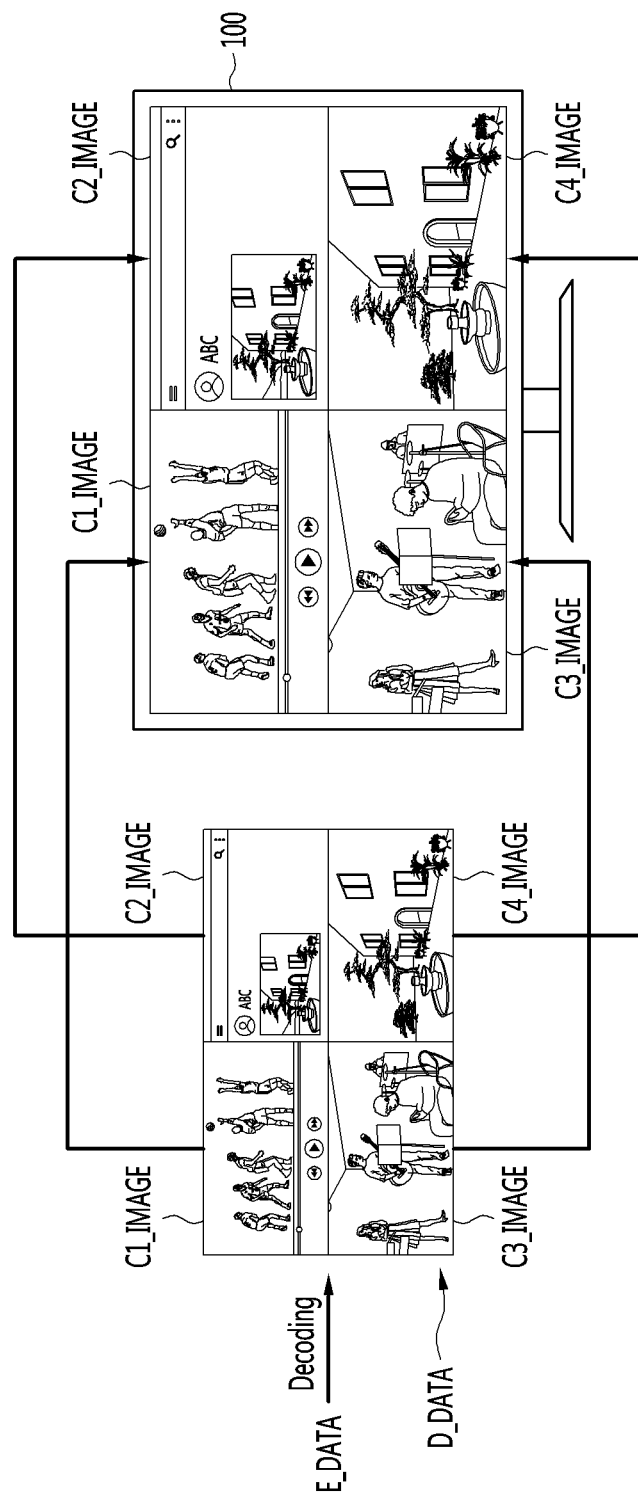

The embodiments shown in FIGS. 8*c* and 8*d* are substantially equal to the embodiments shown in FIGS. 8*a* and 8*b* except that the number of contents to be displayed through the display device 100 is different and thus a detailed description of operations of the display device 100 and the terminal 300 will be omitted.

Referring to FIG. 8*c*, the number of images included in the virtual region V_REGION may be various. If four contents (a first content C1 to a fourth content C4) are selected as a plurality of contents to be displayed through the display device 100, the controller 380 may arrange the images C1_IMAGE, C2_IMAGE, C3_IMAGE and C4_IMAGE of the four contents in the virtual region V_REGION. The controller 380 may encode the virtual region V_REGION using any one of the plurality of encoders included in the encoder/decoder unit 382 and transmit the encoded data E-DATA generated as the result of encoding to the display device 100.

Referring to FIG. 8*d*, the controller 170 of the terminal 100 may decode the encoded data E_DATA received from the terminal 300 using any one decoder.

The controller 170 may extract the images C1_IMAGE, C2_IMAGE, C3_IMAGE and C4_IMAGE included in the decoded data D_DATA generated as the result of decoding and display the extracted C1_IMAGE, C1_IMAGE, C3_IMAGE and C4_IMAGE through the display unit 180.

As shown in FIG. 8*d*, the controller 170 may respectively display the images C1_IMAGE, C2_IMAGE, C3_IMAGE and C4_IMAGE in the divided regions of the display unit 180. However, the present invention is not limited thereto and the display form of the images C1_IMAGE, C2_IMAGE, C3_IMAGE and C4_IMAGE may be variously implemented.

Operation of the terminal 300 and the display device 100 shown in FIGS. 8*a* to 8*d* may be performed every frame of the image of each of the plurality of contents. That is, each of the images C1_IMAGE and C2_IMAGE may mean any one frame of the output screen of the first content C1 or the second content C2.

According to the embodiments shown in FIGS. 8*a* to 8*d*, the terminal 300 may simultaneously encode the images of the plurality of contents to be transmitted to the display device 100 using one encoder. In addition, the display device 100 may decode the encoded data received from the terminal 300 using one decoder and extract each of the images of the plurality of contents included in the decoded data. That is, in the display device 100 and the terminal 300, resources may be efficiently utilized by reducing the number of encoders or decoders for encoding or decoding the plurality of contents and product costs may be reduced by reducing the number of encoders or decoders provided in the device.

Figure 9A:
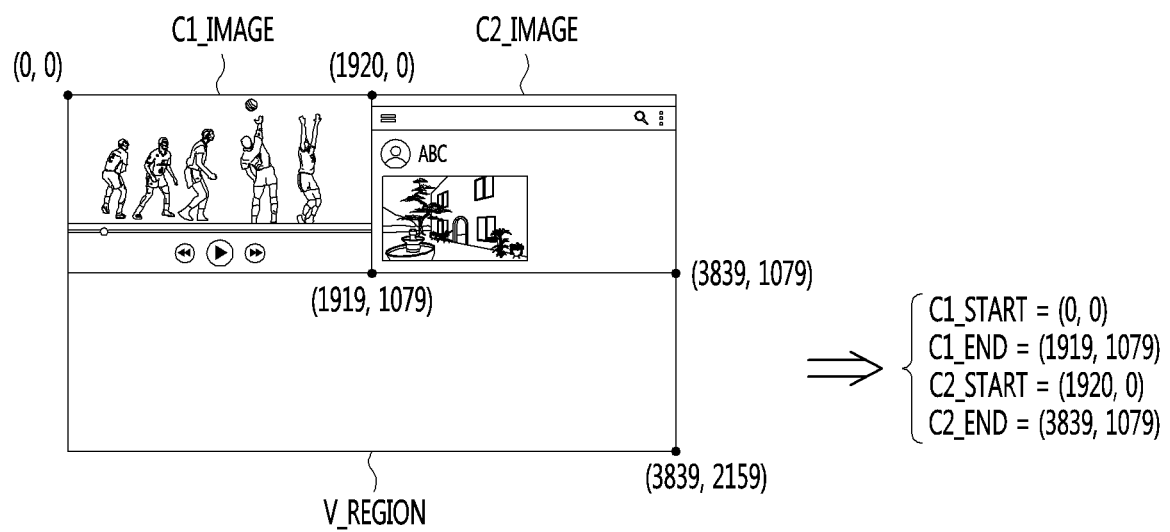
FIGS. 9a to 9b are diagrams showing examples of operation of extracting a plurality of contents using coordinate information of the plurality of contents included in a virtual region.
Figure 9B:
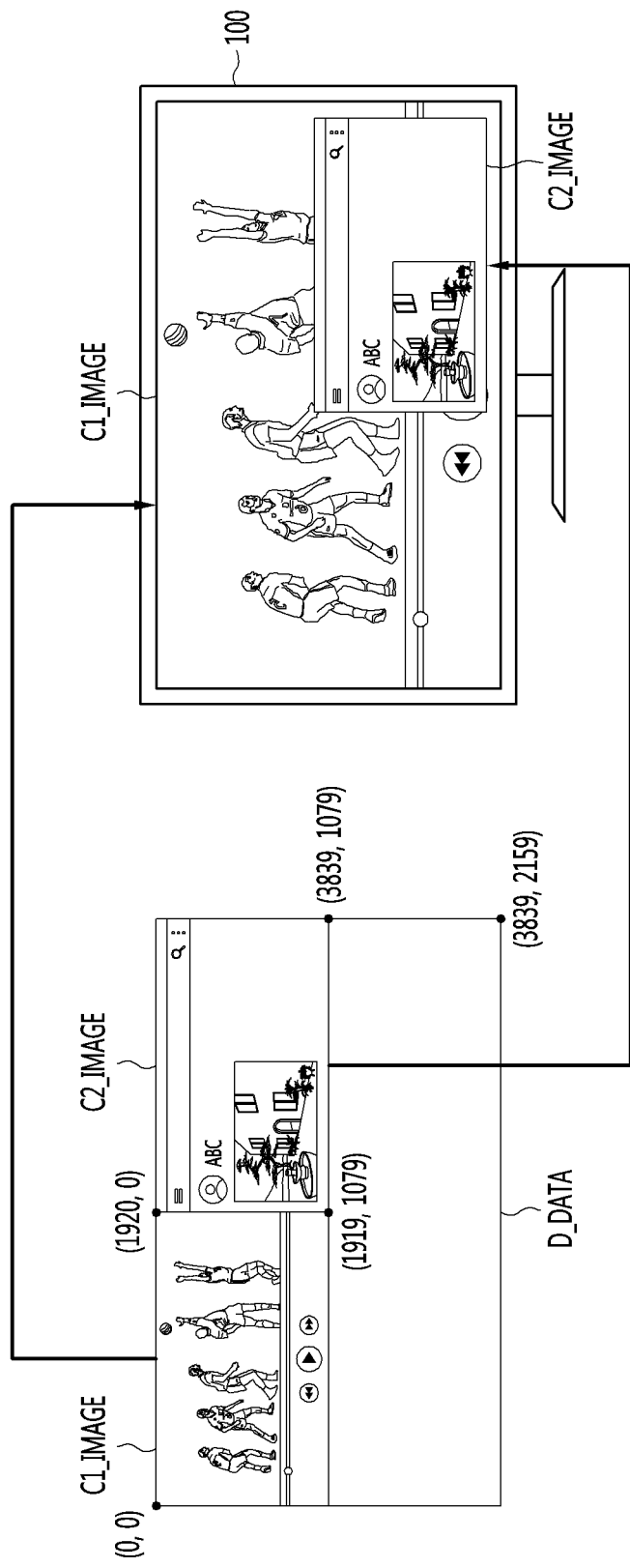

FIGS. 9*a* to 9*b* are diagrams showing examples of operation of extracting each of a plurality of contents using coordinate information of the plurality of contents included in a virtual region.

Referring to FIG. 9*a*, the controller 380 of the terminal 300 may generate coordinate information of the images C1_IMAGE and C2_IMAGE arranged in the virtual region V_REGION. Although the coordinate information of the images C1_IMAGE and C2_IMAGE includes start coordinates and end coordinates, the present invention is not limited thereto and the start coordinates may correspond to the coordinates of the left upper vertex of the image and the end coordinates correspond to the coordinates of the lower right vertex of the image.

The coordinate information may be related to the size of the virtual region V_REGION. For example, if the size of the virtual region V_REGION is 3840*2160, the range of the coordinates included in the coordinate information may be (0, 0) to (3839, 2159).

The controller 380 may generate the coordinate information according to the positions of the images C1_IMAGE and C2_IMAGE. As shown in FIG. 9*a*, the controller 380 may set the start coordinates C1_START of the image C1_IMAGE of the first content to (0, 0) and set the end coordinates C1_END to (1919, 1079), thereby generating the coordinate information of the image C1_IMAGE of the first content. In addition, the controller 380 may set the start coordinates C2_START of the image C2_IMAGE of the second content to (1920, 0) and set the end coordinates C2_END to (3839, 1079), thereby generating the coordinate information of the image C2_IMAGE of the second content.

The controller 380 may transmit the coordinate information of the images C1_IMAGE and C2_IMAGE to the display device 100. The coordinate information of the images C1_IMAGE and C2_IMAGE may be transmitted sequentially or simultaneously with the encoded data E_DATA.

Referring to FIG. 9*b*, the controller 170 of the terminal 100 may receive the coordinate information of each of the images C1_IMAGE and C2_IMAGE from the terminal 300, and extract the images C1_IMAGE and C2_IMAGE included in the decoded data D_DATA based on the received coordinate information.

As described above, since the decoded data D_DATA and the virtual region V_REGION are substantially equal, the coordinates of the images C1_IMAGE and C2_IMAGE included in the decoded data D_DATA may be equal to the coordinates of the images C1_IMAGE and C2_IMAGE included in the virtual region V_REGION. Accordingly, the controller 170 may determine the positions of the images C1_IMAGE and C2_IMAGE included in the decoded data D_DATA using the coordinate information received from the terminal 300 and extract the images C1_IMAGE and C2_IMAGE.

The controller 170 may extract the image C1_IMAGE of the first content using the start coordinates C1_START (0, 0) and the end coordinates C1_END (1919, 1079) of the image C1_IMAGE of the first content. In addition, the controller 170 may extract the image C2_IMAGE of the second content using the start coordinates C2_START (1920, 0) and the end coordinates C2_END (3839, 1079) of the image C2_IMAGE of the second content.

That is, the display device 100 may accurately extract the images C1_IMAGE and C2_IMAGE included in the decoded data D_DATA based on the coordinate information received from the terminal 300.

Figure 10A:
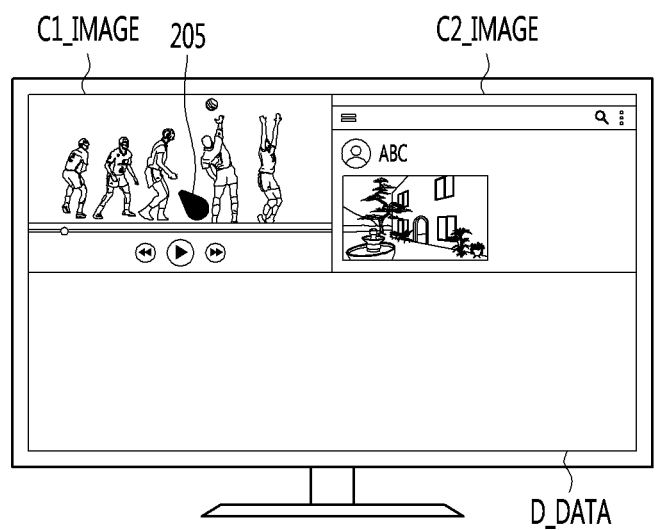
FIGS. 10a to 10b are diagrams showing examples of operation of displaying a plurality of contents received from a terminal on a display device according to the embodiment of the present invention.
Figure 10B:
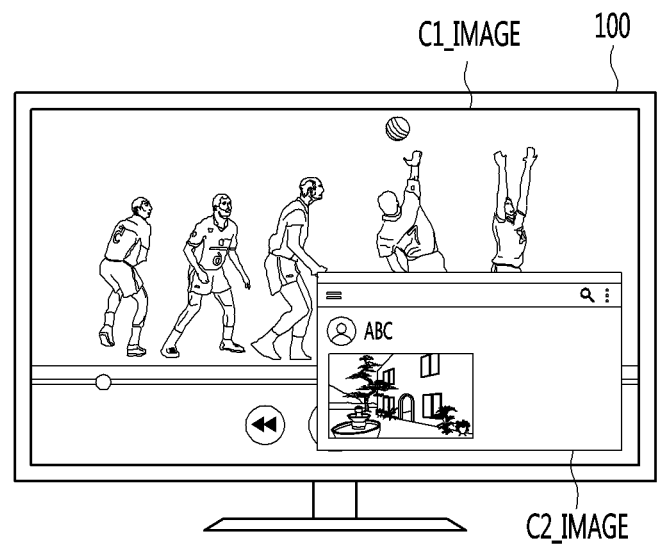

FIGS. 10*a* to 10*b* are diagrams showing examples of operation of displaying a plurality of contents received from a terminal on a display device according to the embodiment of the present invention.

As described above in step S160 of FIG. 7, in operation of displaying the images C1_IMAGE and C2_IMAGE through the display unit 180, the controller 170 may display a screen corresponding to the decoded data including a plurality of images through the display unit 180 and receive a request for selecting any one of the plurality of images included in the displayed screen. The controller 170 may display the image selected according to the received request in the entire region and display the remaining images in partial regions.

Referring to FIG. 10, the controller 170 may display the decoded data D_DATA through the display unit 180. Since the decoded data D_DATA may be substantially equal to the virtual region V_REGION and the image C1_IMAGE of the first content and the image C2_IMAGE of the second content may be arranged in the virtual region V_REGION, the images C1_IMAGE and C2_IMAGE may be displayed in the display unit 180.

The controller 170 may receive the request for selecting any one of the images C1_IMAGE and C2_IMAGE displayed through the display unit 180. As an example of the request for selection, as shown in FIG. 10*a*, the controller 170 may move and display a pointer 205 to and in a region, in which any one image (e.g., the image C1_IMAGE of the first content) is displayed, in response to movement information received from the remote control device 200. The controller 170 may receive the request for selection according to input of a button such as the check button 238 of the remote control device 200 and select the image C1_IMAGE currently displayed at the position of the pointer 205 in response to the received request for selection.

The request for selection shown in FIG. 10a is merely exemplary for convenience of description and thus may be implemented in various forms.

Referring to FIG. 10b, the controller 170 may display the image C1_IMAGE selected according to the request for selection in the entire region of the display unit 180 and display the remaining image C2_IMAGE in a partial region of the display unit 180. In some embodiments, the unselected image C2_IMAGE may not be displayed.

Although not shown, the controller 170 may provide a function for selecting a layout to display the images of the plurality of contents through the display unit 180. In this case, if a specific layout is selected, the controller 170 may receive a request for selecting an image to be displayed in each region of the selected layout and display the images according to the selected layout based on the received request.

Figure 11:
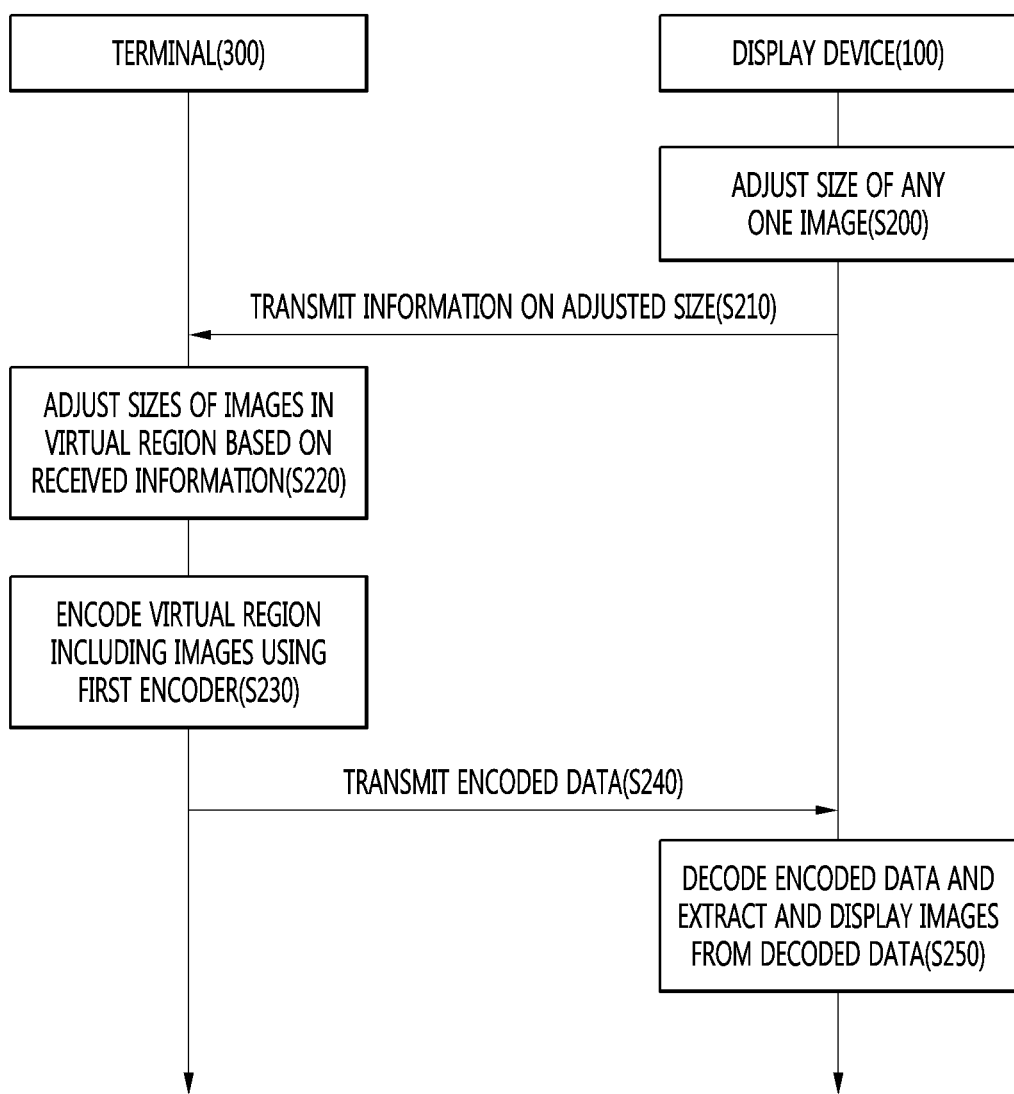
FIG. 11 is a ladder diagram illustrating operation of the display system according to a request for adjusting the size of any one of a plurality of contents displayed on the display device according to the embodiment of the present invention.

FIG. 11 is a ladder diagram illustrating operation of the display system according to a request for adjusting the size of any one of a plurality of contents displayed on the display device according to the embodiment of the present invention.

Referring to FIG. 11, while the images of the plurality of contents are displayed through the display unit 180 according to step S160 of FIG. 7, the display device 100 may receive a request for adjusting any one of the images of the plurality of contents (S200).

For example, the request for adjusting the size may be received through the remote control device 200 connected to the display device 100. In this case, the request for adjusting the size may be implemented by positioning the pointer 205 at an edge or vertex of any one image and then dragging the edge or vertex.

The display device 100 may transmit information related to the adjusted size to the terminal 300 (S210).

The controller 170 may transmit size information related to the adjusted size of any one image to the terminal 300 based on the request for adjusting the size received in step S200. The size information includes coordinate information (start coordinates and end coordinates) of the adjusted image, size change information and movement information (x-axis movement and y-axis movement) of the remote control device 200.

The controller 170 may transmit the size information to the terminal 300 through a separate channel (e.g., a user input back channel (UIBC)) different from the channel for receiving the encoded data.

The terminal 300 may adjust the sizes of the images in the virtual region V_REGION based on the received information (S220).

The controller 380 may adjust the size of at least one of the images of the contents to be transmitted to the display device 100 based on the information related to the adjusted size of any one image received from the display device 100 and arrange the image in the virtual region V_REGION.

For example, if the size of the image is reduced by the request for adjusting the size of any one image, the controller 380 may reduce the size of the image and arrange the image in the virtual region V_REGION. In this case, in some embodiments, the controller 380 may increase the sizes of the other images and arrange the other images in the virtual region V_REGION, thereby reducing image quality deterioration of the other images. In addition, the controller 380 may adjust not only the sizes of the images included in the virtual region V_REGION but also the form of arrangement of the images.

In some embodiments, if only any one of the images of the plurality of contents is displayed through the display unit 180 according to the request for adjusting the size, the controller 380 may arrange only the image in the virtual region V_REGION.

The terminal 300 may encode the virtual region V_REGION including the images having the adjusted sizes using any one encoder (e.g., the first encoder) (S230) and transmit the encoded data to the display device 100 (S240).

The display device 100 may decode the encoded data received from the terminal 300 using any one decoder (e.g., the first decoder) and extract and display the images from the decoded data (S250). Detailed operation of the terminal 300 and the display device 100 in steps S240 and 250 is similar to operation described above with reference to FIGS. 7 to 10b and a detailed description thereof will be omitted.

The steps shown in FIG. 11 will be described in greater detail with reference to FIGS. 12a to 13c.

FIGS. 12a to 12d are diagrams showing an embodiment of operation of the display system shown in FIG. 11.

Figure 12A:
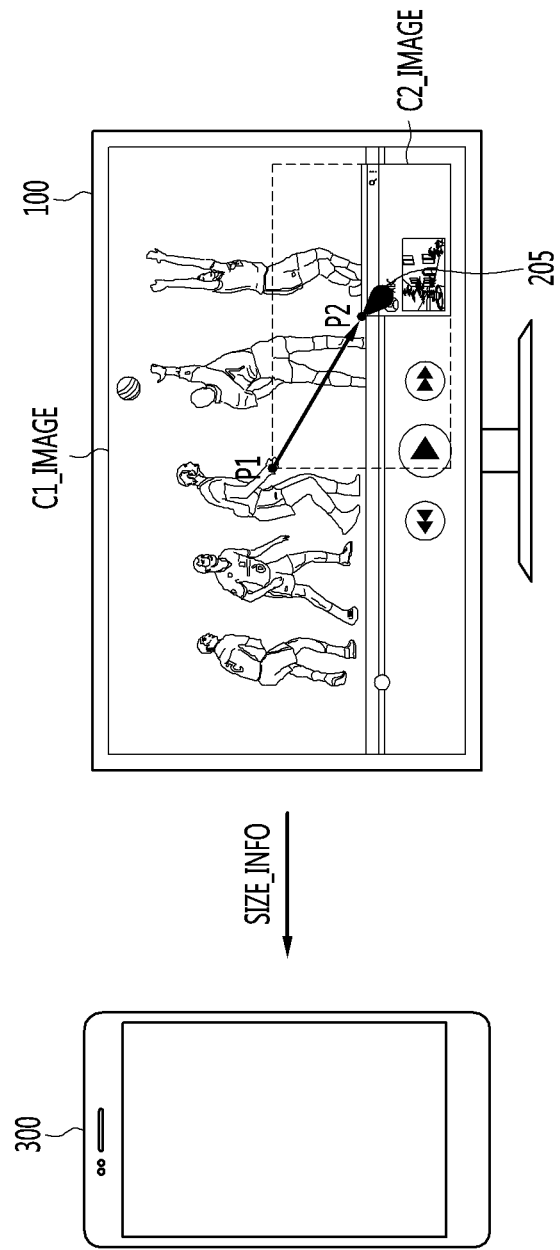
FIGS. 12a to 12d are diagrams showing an embodiment of operation of the display system shown in FIG. 11.

Referring to FIG. 12a, the controller 170 of the terminal 100 may receive the request for adjusting the size of any one (e.g., the image C2_IMAGE of the second content) of the images C1_IMAGE and C2_IMAGE displayed through the display unit 180.

As shown in FIG. 12a, assume that the request for adjusting the size be made by dragging the upper left vertex of the image C2_IMAGE of the second content from a first point P1 to a second point P2 using the pointer 205.

The controller 170 may adjust the size of the image C2_IMAGE of the second content based on the received request for adjusting the size and display the image. That is, the size of the image C2_IMAGE of the second content displayed through the display unit 180 may be reduced according to the request for adjusting the size.

The controller 170 may transmit the size information SIZE_INFO related to the adjusted size of the image C2_IMAGE of the second content to the terminal 300 based on the request for adjusting the size. As described above with reference to FIG. 11, the size information SIZE_INFO may include the coordinates of the second point P2 and the coordinates of the lower right vertex as the coordinate information of the adjusted image C2_IMAGE or include the coordinate change information between the first point P1 and the second point P2 as information related to change in size of the image C2_IMAGE. In some embodiments, the size information SIZE_INFO may include movement information (x-axis movement and y-axis movement) from the first point P1 to the second point P2.

The controller 170 may transmit the size information SIZE_INFO related to the adjusted size of the image C2_IMAGE of the second content to the terminal 300 through a separate channel (e.g., a user input back channel (UIBC)) different from the channel, through which the encoded data E_DATA is received. The UIBC may generally mean a channel used to transmit user input received by the sink device to the source device.

Figure 12B:
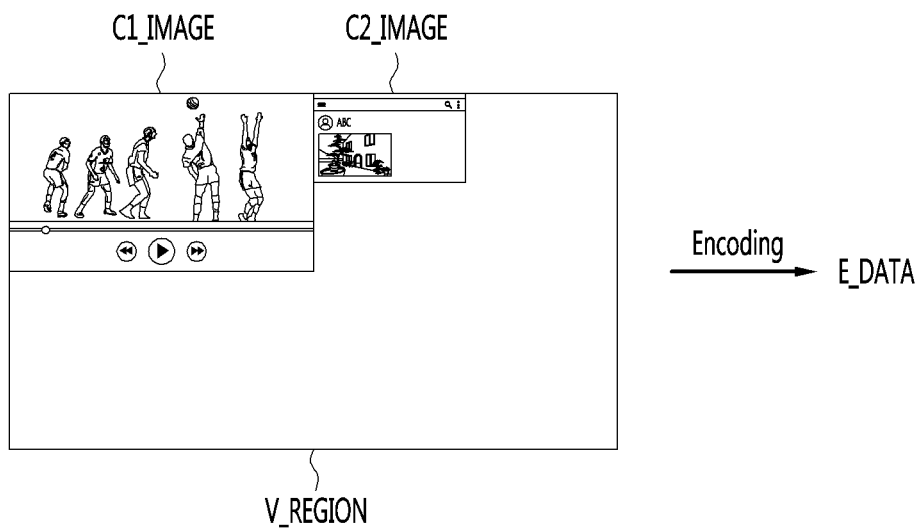
Figure 12C:
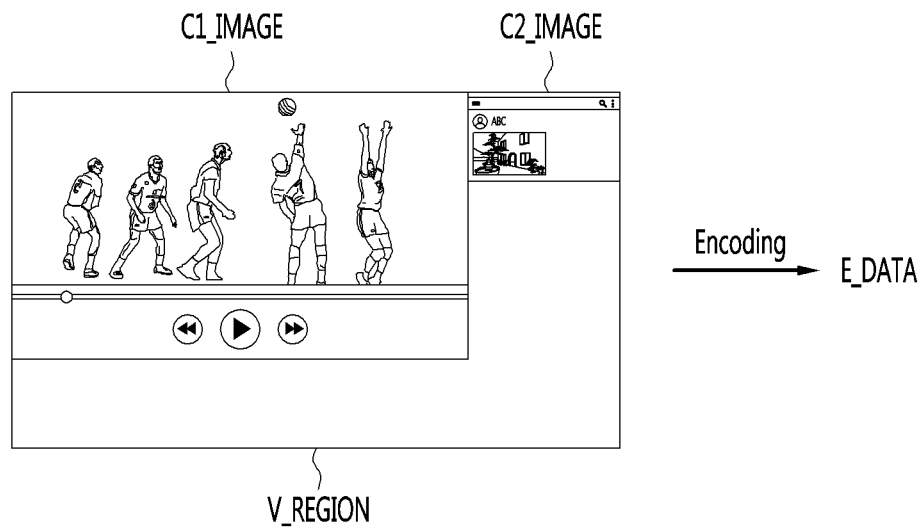

Referring to FIGS. 12b and 12c, the controller 380 of the terminal 300 may receive the size information SIZE_INFO from the display device 100 and adjust the size of at least one of the images C1_IMAGE and C2_IMAGE arranged in the virtual region V_REGION based on the received size information SIZE_INFO.

The controller 380 may determine the size of the image C2_IMAGE of the second content displayed through the display device 100 based on the received size information SIZE_INFO. For example, if the size information SIZE_INFO includes the coordinates of the second point P2 and the coordinates of the lower right vertex of the image C2_IMAGE as the coordinate information of the adjusted image C2_IMAGE, the controller 380 may determine the size of the image C2_IMAGE of the second content based on the coordinate information. Alternatively, if the size information SIZE_INFO includes movement information from the first point P1 to the second point P2, the controller 380 may determine the size of the image C2_IMAGE of the second content using the movement information.

The controller 380 may adjust the sizes of the images C1_IMAGE and C2_IMAGE included in the virtual region V_REGION according to the result of determination. As shown in FIG. 12b, the controller 380 may not adjust the size of the image C1_IMAGE of the first content, the size of which is not adjusted in the display device 100, in the virtual region V_REGION and may adjust the size of the image C2_IMAGE of the second content, the size of which is adjusted in the display device 100.

For example, if it is assumed that the image C2_IMAGE of the second content is displayed with the size corresponding to resolution of 1920*1080 and then is adjusted to the size corresponding to resolution of 1280*720 according to the request for adjusting the size, the controller 380 may adjust the size of the image C2_IMAGE of the second content arranged in the virtual region V_REGION from the size of 1920*1080 shown in FIG. 9a to the size of 1280*720.

In some embodiments, the controller 380 may also adjust the size of the image C1_IMAGE of the first content, the size of which is not adjusted in the display device 100. As shown in FIG. 12c, the controller 380 may decrease the size of the image C2_IMAGE of the second content and increase the size of the image C1_IMAGE of the first content.

As described above with reference to FIG. 12b, if the image C2_IMAGE of the second content is arranged by adjusting the size thereof to the size of 1280*720, the controller 380 may increase the size of the image C1_IMAGE of the first content to the size of 2560*1440 and arrange the image.

The controller 380 may encode the virtual region V_REGION including the images C1_IMAGE and C2_IMAGE having the adjusted sizes and transmit the encoded data E_DATA to the display device 100.

Figure 12D:
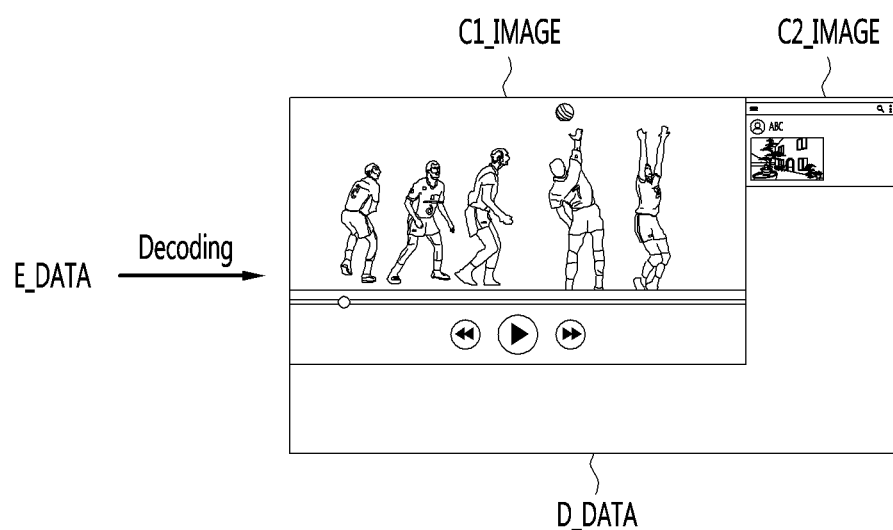

Referring to FIG. 12d, the controller 170 of the terminal 100 may decode the encoded data E_DATA. The sizes of the images C1_IMAGE and C2_IMAGE included in the decoded data D_DATA generated according to the result of decoding may be equal to those of the images C1_IMAGE and C2_IMAGE adjusted in the terminal 300. Assume that the encoded data E_DATA shown in FIG. 12d is generated according to the embodiment shown in FIG. 12c.

The controller 170 may extract the images C1_IMAGE and C2_IMAGE included in the decoded data D_DATA and display the extracted images C1_IMAGE and C2_IMAGE through the display unit 180. Since the size of the image C2_IMAGE of the second content displayed through the display unit 180 is equal to the size of the image in the decoded data D_DATA, the controller 170 may not perform resolution or size conversion with respect to the extracted image C2_IMAGE of the second content.

Similar to the above description of FIG. 8b, the controller 170 may perform resolution or size conversion with respect to the extracted image C1_IMAGE of the first content. However, since the extracted image C1_IMAGE of the first content of FIG. 12d has higher resolution than the extracted image C1_IMAGE of the first content of FIG. 8b, a degree of resolution or size conversion for displaying the image in the entire region of the display unit 180 may be reduced.

That is, the controller 380 of the terminal 300 may increase the size of the image C1_IMAGE of the first content arranged in the virtual region V_REGION, thereby reducing image quality deterioration of the image C1_IMAGE of the first content displayed through the display device 100.

Figure 13A:
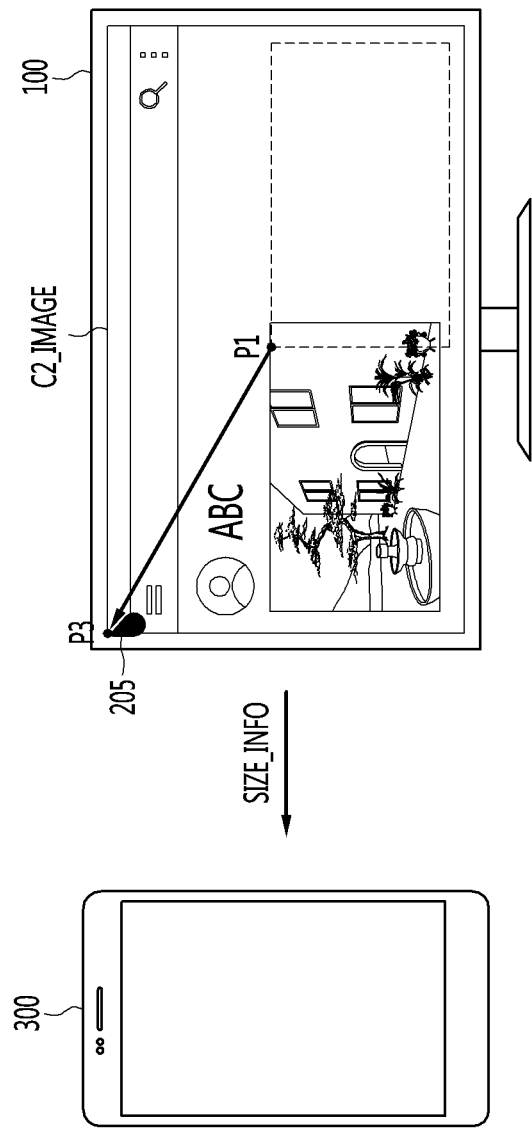
FIGS. 13a to 13c are diagrams showing an embodiment of operation of the display system shown in FIG. 11.
Figure 13B:
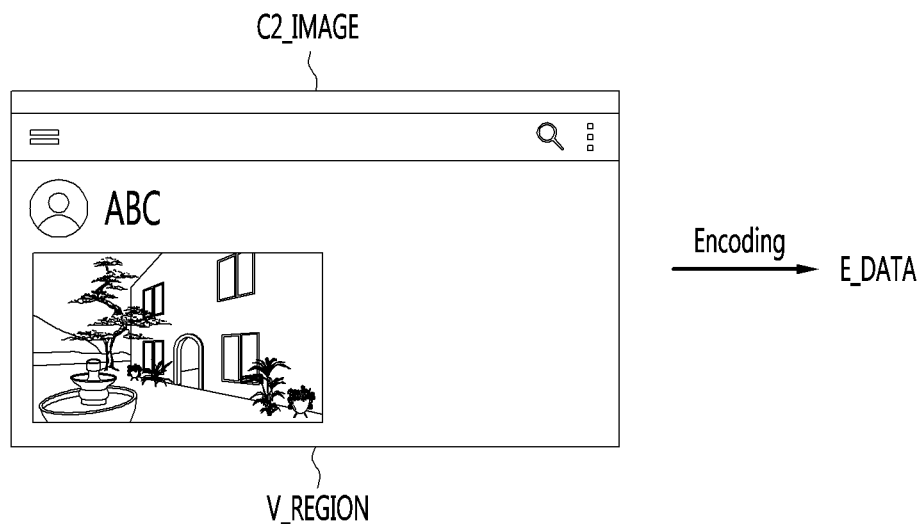
Figure 13C:
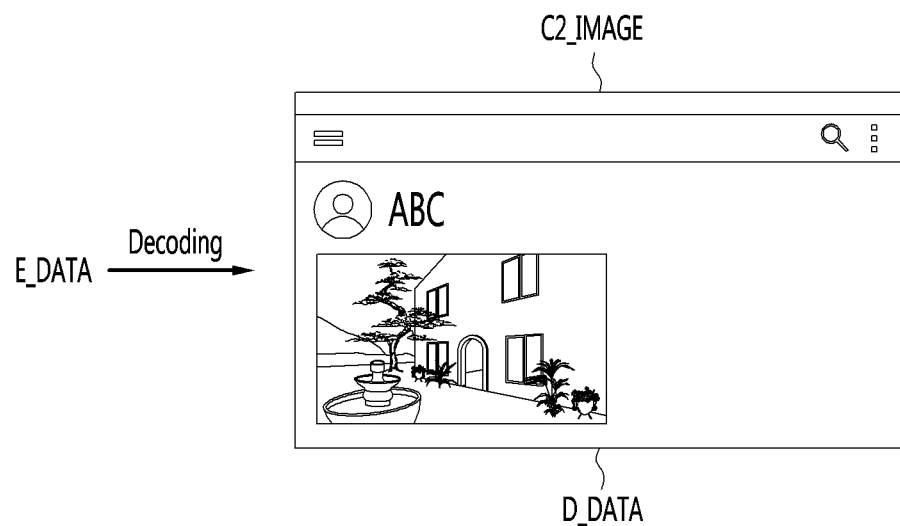

FIGS. 13a to 13c are diagrams showing an embodiment of operation of the display system shown in FIG. 11.

Referring to FIG. 13a, the controller 170 may increase the size of the image C2_IMAGE of the second content in response to a request for adjusting the size by dragging the upper left vertex of the image C2_IMAGE of the second content from the first point P1 to a third point P3. In particular, if the third point P3 corresponds to the upper left vertex of the display unit 180, the controller 170 may display the image C2_IMAGE of the second content in the entire region of the display unit 180. In this case, the image C1_IMAGE of the first content which has been already displayed may be hidden by the image C2_IMAGE of the second content not to be displayed.

The controller 170 may transmit the size information SIZE_INFO related to the adjusted size of the image C2_IMAGE of the second content to the terminal 300 based on the request for adjusting the size. As described above, the size information SIZE_INFO may include the coordinates of the third point P3 and the coordinates of the lower right vertex or include movement information (x-axis movement and y-axis movement) from the first point P1 to the third point P3, as the coordinate information of the adjusted image C2_IMAGE.

Referring to FIGS. 13b and 13c, the controller 380 of the terminal 300 may adjust the sizes of the images C1_IMAGE and C2_IMAGE arranged in the virtual region V_REGION based on the size information SIZE_INFO received from the display device 100.

The controller 380 may determine the size of the image C2_IMAGE of the second content based on the received size information SIZE_INFO. Upon determining that the size of the image C2_IMAGE of the second content corresponds to the entire region of the display unit 180, that is, if only the image C2_IMAGE of the second content is displayed through the display unit 180, the controller 380 may arrange only the image C2_IMAGE of the second content in the virtual region V_REGION. If only the image C2_IMAGE of the second content is arranged in the virtual region V_REGION, the image C2_IMAGE of the second content may be arranged in the entire region of the virtual region V_REGION.

The controller 380 may encode the virtual region V_REGION including the image C2_IMAGE of the second content and transmit the encoded data E_DATA to the display device 100.

Referring to FIG. 13c, the controller 170 of the terminal 100 may decode the encoded data E_DATA received from the terminal 300. The size of the image C2_IMAGE of the second content included in the decoded data D_DATA generated as the result of decoding may be equal to that of the image C2_IMAGE of the second content included in the virtual region V_REGION shown in FIG. 13b.

The controller 170 may display the image C2_IMAGE of the second content through the display unit 180. The size of the image C2_IMAGE of the second content included in the decoded data D_DATA may be equal to that of the image C2_IMAGE displayed through the display unit 180. Accordingly, the controller 170 may not perform resolution or size conversion with respect to the image C2_IMAGE of the second content.

According to the embodiments shown in FIGS. 11 to 13c, if the size of any one of the plurality of contents displayed on the display device 100 is adjusted, the size or shape of the plurality of contents included in the virtual region V_REGION may be automatically optimized according to the adjusted size. Accordingly, it is possible to reduce image quality deterioration which may occur as the images of the plurality of contents are encoded/decoded using one encoder/decoder.

FIG. 14 is a diagram showing an example in which a terminal transmits images of a plurality of contents to a plurality of display devices according to the embodiment of the present invention.

Referring to FIG. 14, the display system may include a plurality of display devices 100_1 to 100_3 connected to the terminal 300. Each of the plurality of display devices 100_1 to 100_3 may display the images C1_IMAGE and C2_IMAGE of the plurality of contents received from the terminal 300 through the display unit 180.

Each of the plurality of display devices 100_1 to 100_3 may display the images C1_IMAGE and C2_IMAGE of the plurality of contents in different forms. For example, the first display device 100_1 may display the image C1_IMAGE of the first content in the entire region of the display unit and may display the image C2_IMAGE of the second content in a partial region of the display unit. In contrast, the second display device 100_2 may display only the image C2_IMAGE of the second content in the entire region of the display unit. In addition, the third display device 100_3 may display the image C2_IMAGE of the second content in the entire region of the display unit and display the image C1_IMAGE of the first content in a partial region of the display unit.

According to the embodiments of the present invention, the terminal 300 may encode the image C1_IMAGE of the first content and the image C2_IMAGE of the second content using only one encoder and transmit the encoded data E_DATA to each of the plurality of display devices 100_1 to 100_3. Each of the plurality of display devices 100_1 to 100_3, which has received the encoded data E_DATA, may decode the encoded data E_DATA using any one decoder and extract the images C1_IMAGE and C2_IMAGE from the decoded data D_DATA1, D_DATA2 or D_DATA3. The decoded data D_DATA1 to D_DATA3 may be equal to one another. Each of the display devices 100_1 to 100_3 may display the extracted images C1_IMAGE and C2_IMAGE in various forms.

That is, the terminal 300 may encode the images C1_IMAGE and C2_IMAGE using any one encoder, generate encoded data E_DATA and transmit the same encoded data E_DATA to each display device, regardless of the number of display devices, to which the images C1_IMAGE and C2_IMAGE will be transmitted. Each of the display devices 100_1 to 100_3 may receive and decode the same encoded data E_DATA from the terminal 300, extract the images C1_IMAGE and C2_IMAGE from the decoded data D_DATA1 to D_DATA3, and display the extracted images in various forms.

The invention can also be embodied as computer readable codes on a computer readable recording medium. The computer readable recording medium is any data storage device that can store data which can be thereafter read by a computer system. Examples of the computer readable recording medium include hard disk drives (HDDs), solid state disks (SSDs), silicon disk drive (SDDs), read-only memories (ROMs), random-access memories (RAMs), CD-ROMs, magnetic tapes, floppy disks, optical data storage devices, and carrier waves (such as data transmission through the Internet). The computer may include the controller of the display device. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:
1. A display device comprising:
a network interface configured to establish connection with a terminal;
a decoder configured to decode encoded data received from the terminal;
a display unit; and
a controller configured to:
receive, from the terminal, the encoded data obtained by integrally encoding images of a virtual region, in which images of a plurality of contents are arranged, and coordinate information of each of the images of the plurality of contents corresponding to the virtual region,
control the decoder to decode the encoded data,
extract each of the images of the plurality of contents from decoded data generated as a result of decoding based on the received coordinate information, and
control the display unit to display each of the extracted images,
wherein the controller is further configured to:
receive a request for adjusting a size of any one of the images of the plurality of contents displayed through the display unit,
transmit size information of the image adjusted based on the request for adjusting the size to the terminal, and
receive, from the terminal, encoded data obtained by integrally encoding the images of the plurality of contents having the size adjusted based on the size information.

2. The display device according to claim 1, wherein the controller:
controls the display unit to display a screen corresponding to the decoded data,
receives a request for selecting any one of the images of the plurality of contents included in the displayed screen, and
controls the display unit to display the selected image in an entire region of the display unit and to display the remaining images in partial regions.

3. The display device according to claim 1, wherein, if only one of the images of the plurality of images is displayed through the display unit according to the request for adjusting the size, the controller receives, from the terminal, the encoded data obtained by encoding only the image.

4. The display device according to claim 1, wherein the controller transmits the size information to the terminal through a user input back channel (UIBC).

5. A display system comprising:
a terminal configured to:
integrally encode a virtual region, in which images of a plurality of contents is arranged, using an encoder to generate encoded data, and
transmit coordinate information of each of the images of the plurality of contents and the encoded data to a display device,
wherein the display device is configured to:
receive the encoded data and coordinate information from the terminal,
decode the encoded data using a decoder,
extract the images of the plurality of contents from decoded data generated as a result of decoding based on the received coordinate information, and
display each of the extracted images through a display unit,
wherein the display device is further configured to:
receive a request for adjusting a size of any one of the images of the plurality of contents displayed through the display unit, and
transmit size information of the image adjusted based on the request for adjusting the size to the terminal, and
wherein the terminal is further configured to:
adjust the size of any one of the plurality of images arranged in the virtual region based on the received size information, and
encode the virtual region using the encoder and transmits the encoded data generated as a result of encoding to the display device.

6. The display system according to claim 5, wherein the terminal:
arranges the images of the plurality of contents in a virtual region corresponding to maximum resolution supported by the encoder,
encodes the virtual region, in which the images of the plurality of contents is arranged, using the encoder, and
transmits the encoded data generated as a result of encoding to the display device.

7. The display system according to claim 6, wherein the decoded data generated as a result of decoding is substantially equal to the virtual region.

8. The display system according to claim 5, wherein, if only one of the images of the plurality of contents is displayed through the display unit according to the request for adjusting the size, the terminal arranges only the image in the virtual region.

9. The display system according to claim 5, wherein the display device transmits the size information to the terminal through a user input back channel (UIBC).

10. The display system according to claim 5, wherein the display device:
displays a screen corresponding to the decoded data through the display unit,
receives a request for selecting any one of the images of the plurality of contents included in the displayed screen, and
displays the selected image in an entire region of the display unit and displays the remaining images in partial regions.

11. The display system according to claim 5, wherein the display device includes a plurality of display devices,
wherein the terminal transmits the encoded data to each of the plurality of display devices,
wherein each of the plurality of display devices receives the encoded data from the terminal, decodes the encoded data using a decoder and extracts and displays each of the images of the plurality of contents from decoded data generated as a result of decoding, and
wherein each of the plurality of display devices displays the images of the plurality of contents in different forms.

* * * * *